US011233553B2

(12) United States Patent
He et al.

(10) Patent No.: US 11,233,553 B2
(45) Date of Patent: Jan. 25, 2022

(54) METHOD AND DEVICES FOR ESTIMATION OF MIMO CHANNEL STATE INFORMATION

(71) Applicant: Telefonaktiebolaget LM Ericsson (publ), Stockholm (SE)

(72) Inventors: Anqi He, Beijing (CN); Virgile Garcia, Antibes (FR); Niklas Jaldén, Enköping (SE); Bo Lincoln, Lund (SE); Hai Wang, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 43 days.

(21) Appl. No.: 16/767,153

(22) PCT Filed: Feb. 6, 2018

(86) PCT No.: PCT/CN2018/075476
§ 371 (c)(1),
(2) Date: May 27, 2020

(87) PCT Pub. No.: WO2019/148511
PCT Pub. Date: Aug. 8, 2019

(65) Prior Publication Data
US 2020/0389216 A1    Dec. 10, 2020

(30) Foreign Application Priority Data
Feb. 5, 2018  (WO) ................ PCT/CN2018/075215

(51) Int. Cl.
*H04B 7/06*    (2006.01)
*H04B 7/0456*    (2017.01)
*H04L 25/02*    (2006.01)

(52) U.S. Cl.
CPC ......... *H04B 7/0626* (2013.01); *H04B 7/0486* (2013.01); *H04B 7/0617* (2013.01); *H04L 25/0226* (2013.01); *H04L 25/0242* (2013.01)

(58) Field of Classification Search
CPC .. H04B 7/0626; H04B 7/0486; H04B 7/0617; H04L 25/0226; H04L 25/0242
See application file for complete search history.

(56) References Cited

U.S. PATENT DOCUMENTS 10,574,486 B2 *  2/2020  Park ................... H04L 25/03
10,855,425 B2 * 12/2020  Kons .................. H04L 25/0226
(Continued)

FOREIGN PATENT DOCUMENTS

CN    107079308 A    8/2017

OTHER PUBLICATIONS

PCT International Search Report and Written Opinion, dated Jun. 27, 2018, for International Application PCT/CN2018/075476, 8 pages.

*Primary Examiner* — Jaison Joseph
(74) *Attorney, Agent, or Firm* — Sage Patent Group

(57) ABSTRACT

A method for estimating Multiple Input Multiple Output, MIMO, channel state information for a radio link between a first radio node including a number N, N≥2, of receiving antenna ports and a second radio node including a number M, M≥2, of transmitting antenna ports. The method includes obtaining partial channel state information from a reference signal transmitted by a number X, 1≤X<M, of said transmitting antenna ports and received by all of said receiving antenna ports, said partial channel state information providing a measure for the N×X propagation channels between all of said receiving antenna ports and said transmitting antenna ports. Also disclosed are corresponding devices and computer programs. Also disclosed is a method for controlling transmission based on estimated channel state information.

20 Claims, 18 Drawing Sheets

(56) References Cited

U.S. PATENT DOCUMENTS

| | | | |
|---|---|---|---|
| 2012/0300867 A1 | 11/2012 | Chen et al. | |
| 2014/0294108 A1* | 10/2014 | Etkin | H04B 7/066 375/267 |
| 2014/0307816 A1* | 10/2014 | Alex | H04L 25/0204 375/267 |
| 2017/0311321 A1 | 10/2017 | Kakishima et al. | |
| 2018/0069323 A1* | 3/2018 | Tong | H01Q 21/064 |
| 2019/0068303 A1* | 2/2019 | Gao | H04L 5/005 |
| 2021/0273695 A1* | 9/2021 | He | H04B 7/0626 |

* cited by examiner

METHOD AND DEVICES FOR ESTIMATION OF MIMO CHANNEL STATE INFORMATION

CROSS-REFERENCE TO RELATED APPLICATIONS

This application is a 35 U.S.C. § 371 national stage application for International Application No. PCT/CN2018/075476, entitled "METHOD AND DEVICES FOR ESTIMATION OF MIMO CHANNEL STATE INFORMATION", filed on Feb. 6, 2018, which claims the benefit of International Application No. PCT/CN2018/075215, filed on Feb. 5, 2018, the disclosures and contents of which are hereby incorporated by reference in their entireties.

TECHNICAL FIELD

The proposed technology generally relates to methods, devices, computer programs and apparatuses for estimating channel state information for Multiple Input Multiple Output links, MIMO links. The proposed technology also relate to methods for controlling transmissions based on estimate channel state information.

BACKGROUND

Future generations of wireless system are expected to provide ubiquitous high data-rate coverage. Achieving this requires an efficient use of the available resources. In light of this higher number of antenna ports, at both the transmitter and receiver, are considered in future standards of, for example, Long Term Evolution, LTE, and New Radio, NR. It is possible to exploit the spatial degrees of freedom offered by the multipath fading inside the wireless channel in order to provide a substantial increase in the data rates and also increase the reliability of wireless transmission. In the downlink, for example, there are three basic approaches for utilizing the antenna: diversity, multiplexing and beamforming.

The gains from both diversity, multiplexing as well as beamforming depends on how well the transmitting antenna system knows the spatial nature of the channel, and hence its ability of direct the energy to the target users, and also how well it avoids emitting energy to any interfering users. Methods to acquire spatial channel information, CSI, is usually divided in two parts, namely feed-back based and reciprocity based. A typical feedback based scheme is a codebook based scheme. A codebook is typically a standardized set of available precoding code-words, and essentially consists of all possible combinations, respective antenna element weightings, that the transmitter may use when transmitting data. When using codebook based transmissions, a network node such as an eNodeB, eNB, transmits training sequences that another network node, e.g., a UE will receive. Given this information, each user, which knows the codebook prior to transmission, may estimate what the gain would be for each code word and then feedback information of this to the eNB. The eNB uses the feedback information to determine which pre-coders to use when transmitting the data. When using codebook based methods, the UE can measure on both its antennas and decide/recommend eNB precoding that optimizes two-antenna reception. It should be noted that codebook based transmissions are by design limited to the subset of all possible pre-coders that are represented within the codebook known to the UEs.

Another method for UE specific precoding is to utilize the reciprocity of the channel, hence, assuming that the UL channel and DL channel are similar. This is a possibility in time division duplexing, TDD, systems that transmits both uplink, UL, and downlink, DL, on the same frequency, i.e., time duplexed. In such a system, the UEs send sounding sequences to e.g., a eNB, which utilizes these to determine the channel conditions. In LTE and NR the sequences used are often sounding reference signals, SRS, other reference signals are however possible, such as a DeModulation Reference Signal, DMRS. A particular purpose of using reciprocity is to reduce the overhead and the need to transmit pilot signals and/or feedback. Even though it may be possible to obtain good Channel State Information, CSI, using feedback based schemes it becomes unpractical in massive MIMO systems due to the large number of antennas used. This is one of the reasons that reciprocity is used since it may provide a network node with more and richer CSI than what is usually obtained through the implicit codebook channel information in codebook based reporting. More detailed CSI allows for e.g., more exotic DL precoding schemes, not limited to a predefined subset, and hence potentially higher order spatial multiplexing and throughput rates. In order to determine high quality channel information from all eNB antennas to all UE antennas, it is required that the UE transmits the sounding signals or reference signals on all the antennas that is utilized for DL reception.

Most UE's today utilizes two antennas for reception, and hence supports 2-layer transmissions in downlink, DL. However, in the uplink, UL, only a single antenna is used for transmission. The lower number of transmitting antennas compared to the receiving antennas, limits the channel sounding possibility in reciprocity based communication. The result is that the eNB will only have partial channel state information, partial CSI, available for DL transmissions. Unfortunately, it is expected that most UEs in the near future will also have lower number of transmitting than receiving antennas. One reason for this is that for a fixed transmit power, the power per antenna would be lower, which would potentially decrease UL coverage. One mitigation of this would be to use antenna switching and take turn in sounding the channel, such that over time, the eNB would know the channel to all receiving UE antennas. Even though that some of todays' chipsets support antenna switching for dual antenna sounding, this is still not utilized in the UEs. It is assumed that one cause of this is the possible transmit power loss that occur when switching antennas. Regardless, the lack of proper dual antenna sounding today results in only half the available channel information at the eNB which decreases the possible spatial multiplexing and hence system capacity.

The proposed technology aims to at least counter some of the problem associated with missing channel state information for MIMO transmissions.

SUMMARY

It is an object to provide mechanisms that enables network nodes to estimate richer channel state information from obtained partial channel state information. It is another object to provide mechanisms for controlling transmissions based on estimated channel state information.

It is still another object of the proposed technology to provide devices and apparatuses that will enable the extraction of richer channel state information based on obtained partial channel state information.

It is yet another object of the proposed technology to provide devices and apparatuses for controlling transmission based on channel state information that has been estimated based on obtained partial channel state information.

It is still a further object of the proposed technology to provide a computer program for estimating richer channel stated information based on obtained channel state information.

Another object of proposed technology is to provide a carrier comprising computer program for estimating richer channel stated information based on obtained channel state information.

These and other objects are met by embodiments of the proposed technology.

According to a first aspect, there is provided a method for estimating Multiple Input Multiple Output, MIMO, channel state information for a radio link between a first radio node comprising a number N, N≥2, of receiving antenna ports and a second radio node comprising a number M, M≥2, of transmitting antenna ports. The method comprises the step of obtaining partial channel state information from a reference signal transmitted by a number X, 1≤X<M, of the transmitting antenna ports and received by all of the receiving antenna ports, the partial channel state information providing a measure for the N×X propagation channels between all of the receiving antenna ports and the transmitting antenna ports. The method also comprises estimating MIMO channel state information for all N×M propagation channels between the receiving antenna ports and the transmitting antenna ports based on at least one measure assignment model that assign measures to the propagation channels between all of the receiving antenna ports and the remaining number of transmitting antenna ports that did not transmit the reference signal, and based on the obtained partial channel state information.

According to a second aspect of the proposed technology there is provided a method for controlling a transmission comprising the method according to the first aspect.

According to a third aspect of the proposed technology there is provided a network device configured to estimate Multiple Input Multiple Output, MIMO, channel state information for between a first radio node comprising a number N, N≥2, of receiving antenna ports and a second radio node comprising a number M, M≥2, of transmitting antenna ports. The network device is configured to obtain partial channel state information from a reference signal transmitted by a number X, 1≤X<M, of the transmitting antenna ports and received by all of the receiving antenna ports, the partial channel state information providing a measure for the N×X propagation channels between all of the receiving antenna ports and the transmitting antenna ports. The network device is also configured to estimate MIMO channel state information for all N×M propagation channels between the receiving antenna ports and the transmitting antenna ports based on at least one measure assignment model that assign measures to the propagation channels between all of the receiving antenna ports and the remaining number of transmitting antenna ports that did not transmit the reference signal, and based on the obtained partial channel state information.

According to a fourth aspect of the proposed technology there is provided a network device configured to control transmissions, wherein the network device comprises a network device according to the third aspect.

According to a fifth aspect of the proposed technology there is provided a computer program for estimating, when executed, Multiple Input Multiple Output, MIMO, channel state information for a radio link between a first radio node comprising a number N, N≥2, of receiving antenna ports and a second radio node comprising a number M, M≥2, of transmitting antenna ports, wherein the computer program comprises instructions, which when executed by at least one processor, cause the at least one processor to:

read partial channel state information obtained from a reference signal transmitted by a number X, 1≤X<M, of the transmitting antenna ports and received by all of the receiving antenna ports, the partial channel state information providing a measure for the N×X propagation channels between all of the receiving antenna ports and the transmitting antenna; and estimate MIMO channel state information for all N×M propagation channels between the receiving antenna ports and the transmitting antenna ports based on at least one measure assignment model that assign measures to the propagation channels between all of the receiving antenna ports and the remaining number of transmitting antenna ports that did not transmit the reference signal, and based on the obtained partial channel state information; and output a representation of the estimate of the MIMO channel state information for all N×M uplink propagation channels.

According to a sixth aspect of the proposed technology there is provided a carrier containing the computer program of the fifth aspect, wherein the carrier is one of an electronic signal, optical signal, radio signal, or computer readable storage medium.

According to a seventh aspect of the proposed technology there is provided an apparatus for estimating, when executed, full rank Multiple Input Multiple Output, MIMO, channel state information for a radio link between a first radio node comprising a number N, N≥2, of receiving antenna ports and a second radio node comprising a number M, M≥2, of transmitting antenna ports. The apparatus comprises a reading module for reading partial channel state information obtained from a reference signal transmitted by a number X, 1≤X<M, of the transmitting antenna ports and received by all of the receiving antenna ports, the partial channel state information providing a measure for the N×X propagation channels between all of the receiving antenna ports and the transmitting antenna ports. The apparatus also comprises a processing module for estimating MIMO channel state information for all N×M uplink propagation channels between the receiving antenna ports and the transmitting antenna ports based on at least one measure assignment model that assign measures to the propagation channels between all of the receiving antenna ports and the remaining number of transmitting antenna ports that did not transmit the reference signal, and based on the obtained partial channel state information. The apparatus further comprises an output module for outputting a representation of the estimate of the MIMO channel state information for all N×M propagation channels.

Embodiments of the proposed technology makes it possible to obtain estimates of unknown channel state information, i.e., channel state information for links between receiving antennas and transmitting antennas that has not actively transmitted a reference signal. The estimate will enable a better control of a radio transmissions since the estimated channel state information can be used for e.g., pre-coding of antenna weights, an efficient scheduling of transmission, suitable link adaption and selection of transmission rank. By providing estimates of the full MIMO channel state information given the partial channel state information a radio node is allowed to transmit with higher order of spatial multiplexing which reduces potential losses in system capacity due to limitations on a receiving radio node.

The proposed technology also enable faster transmission of data to a receiving node due to higher spectral efficiency. This will in turn enable a radio node to have longer idle times which may potentially decrease the average experienced interference. Longer idle times at a radio node may further potentially be used to power down and save energy.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 4A:
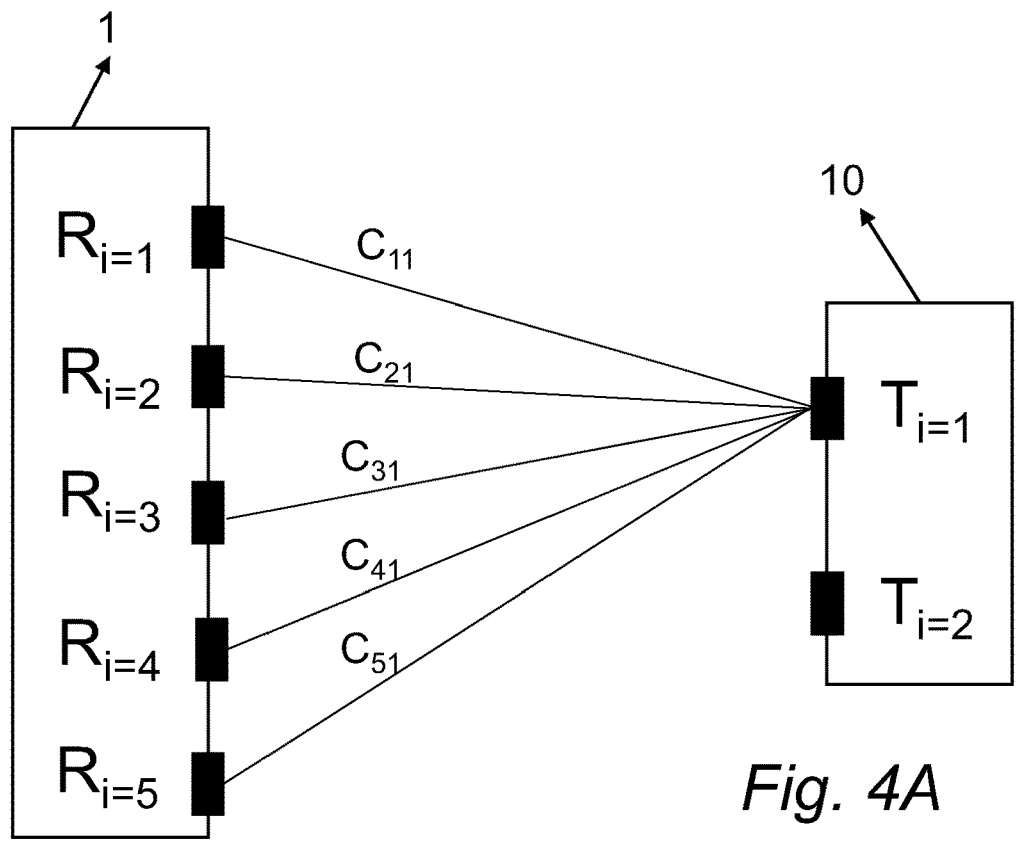
FIG. 4A is a schematic diagram illustrating the transmission of a reference signal from a second radio node to a first radio node. Only a single antenna transmits the reference signal but it is received by a number (five) of receiving antenna ports.

For a better understanding of the proposed technology, it may be useful to begin with a brief system overview and an analysis of the technical problem. In wireless communication, channel state information, CSI, is related to channel properties of a particular communication link, e.g., a radio link between a receiving radio node and a transmitting radio node. This may for example be the radio link between a base station and a User Equipment, UE. The channel state information provides a description or a measure of the way in which a signal propagates from a transmitting antenna to a receiving antenna. Knowledge of channel state information enables one to determine how a signal is affected during travel from the transmitting antenna towards the receiving antenna. It may for example be possible to obtain measures on how the signal has been scattered, the fading pattern of the signal and also possible signal power decay. It is in particular possible to obtain information on how these effects depend on the distance between the transmitting- and receiving antennas. Of particular importance in modern wireless network technology, such as wireless telecommunication networks is the use of Multiple Input Multiple Output technology, MIMO technology. MIMO technology relates to a specific method for increasing the radio link capacity by using several, i.e., multiple, transmitting and receiving antennas with the objective to exploit multipath propagation. A radio node such as a UE does however often utilize fewer antenna ports for transmission than for reception. This fact leads to certain problems during channel state information collection based on the transmission of reference signals, e.g., sounding reference signals. To appreciate the problems reference is made to FIG. 4A. FIG. 4A provides a schematic illustration of two radio nodes 1, 10. The first radio node 1 may for example be a network node such as an eNodeB and the second radio 10 may be, e.g., a User Equipment, US. The first radio node comprises five receiving antenna ports denoted $R_i$, i=1, 2 . . . 5, and the second radio node 10 comprises two possibly transmitting antenna ports denoted $T_i$, i=1, 2. During regular collection of channel state information, the radio node 10 will transmit from a single one of these antenna ports, e.g., antenna port $T_1$. The reference signal transmitted from $T_1$ will be received by all of the receiving antenna ports $R_i$, i=1, 2 . . . 5 and this will provide information relating to the five possible different radio links between the transmitting antenna port and the receiving antenna ports. The different links between the transmitting antenna port $T_1$, and a specific receiving antenna port $R_k$, is denoted $C_{k1}$ in the drawing. This will however only yield partial channel state information since any knowledge of the radio links between the transmitting antenna port $T_2$ and the receiving antennas $R_i$, i=1, 2 . . . 5 is lacking.

Figure 4B:
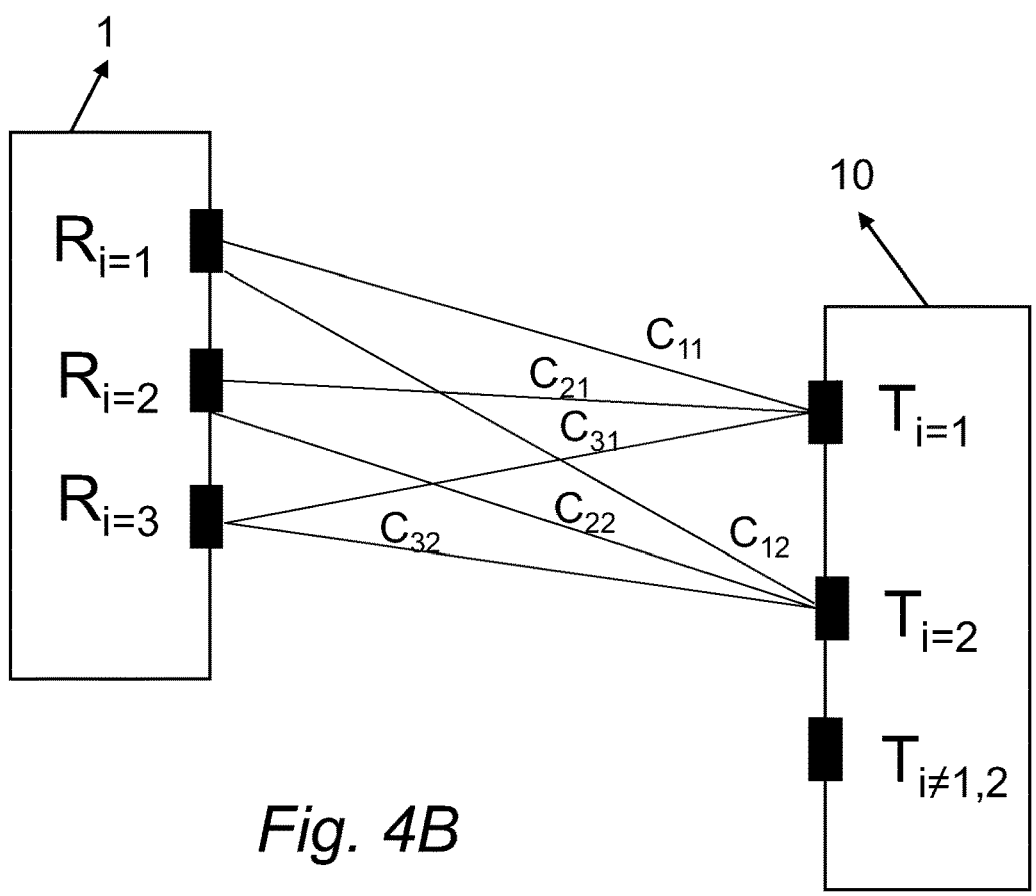
FIG. 4B is a schematic diagram illustrating the transmission of a reference signal from a second radio node to a first radio node. Two antenna ports transmit the signal and three receiving antenna ports receive the signal.
Figure 5:
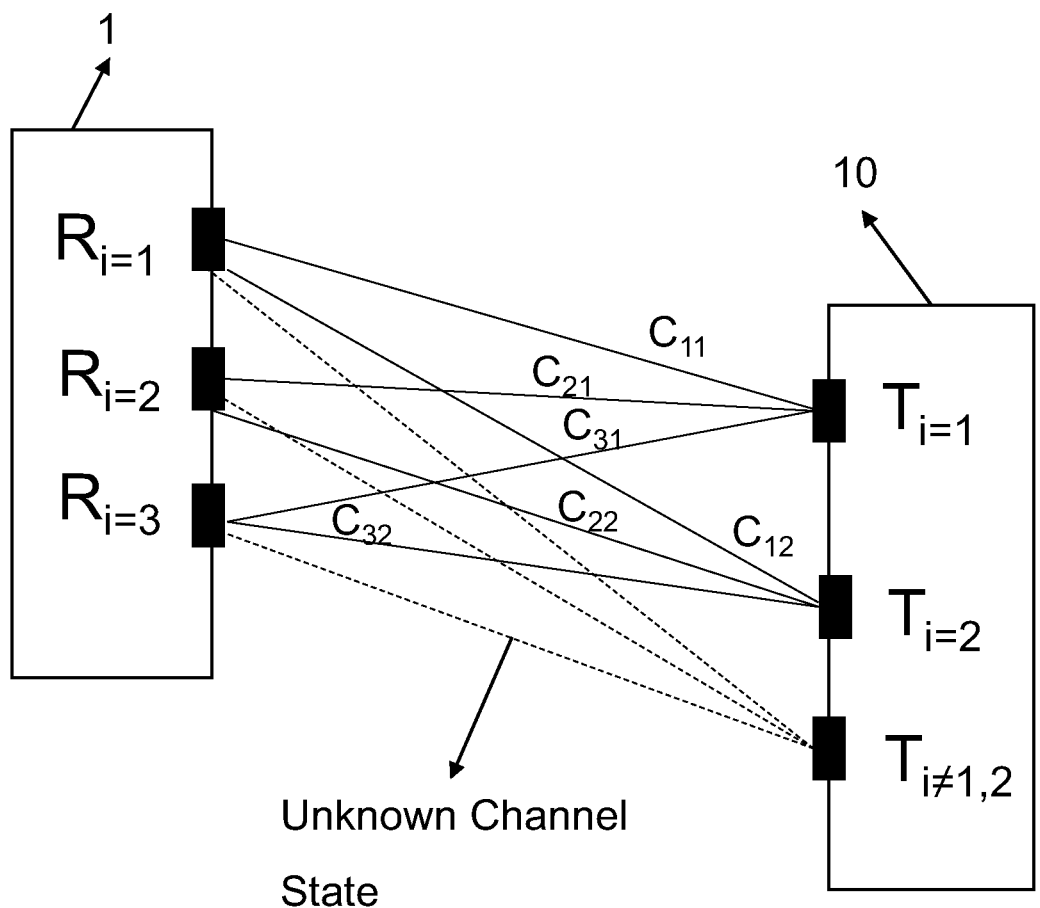
FIG. 5 is a schematic flow diagram illustrating unknown channel state information for a scenario where a reference signal has been transmitted from a second radio node to a first radio node using only two transmitting antennas from a number of potentially transmitting antennas.

To further illustrate the problem reference is made to FIG. 4B. FIG. 4B provides a schematic illustration of two radio nodes 1, 10, wherein as above the first radio node 1 may for example be a network node such as an eNodeB and the second radio 10 may be, e.g., a User Equipment, US. The first radio node comprises three receiving antenna ports denoted $R_i$, i=1, 2, 3, in this example and the second radio node 10 comprises two transmitting antenna ports denoted $T_i$, i=1, 2 and some additional possibly transmitting antenna ports denoted $T_{i \neq 1,2}$, where the index i runs over all additional transmitting antenna ports. During regular collection of channel state information, the radio node 10 will transmit a reference signal from the antenna ports $T_1$ and $T_2$. This reference signal will be received by the receiving antenna ports in the radio node 1. The propagation channels for which partial channel information can be obtained from the reference signal is denoted $C_{ki}$ in FIG. 4B. Here the index k refers to the receiving antenna ports and i refers to the transmitting antenna ports. Also this example illustrates a scenario where only partial channel state information is obtained from the reference signal(s). It is clear from FIG. 5 that the channel state information for all the radio links $C_{ki}$ between the additional antenna ports $T_{i \neq 1,2}$ that did not actively transmit the reference signal and the receiving antenna ports $R_i$, i=1, 2, 3 is unknown.

In order to be able to e.g., control transmission from the network node 1 in an efficient manner it would be highly beneficial to have at least a rudimentary estimate of the latter radio links. The proposed technology aims to provide mechanism whereby such information can be obtained.

We begin the description of the proposed technology by providing a birds eye view of a method for estimating unknown channel state information based on partial channel information obtained by means of a reference signal. The birds eye view are perhaps best illustrated for the case where a first radio node 1 comprises a number N, N≥2, of receiving antenna ports $R_i$, i=1, . . . N, and a second node 10 comprises a number M, M≥2, of transmitting antenna ports $T_i$, i=1, . . . M, and where the reference signal is transmitted from a single one of these transmitting antenna ports, e.g., $T_1$.

The procedure begins when the transmitting antenna port $T_1$ of the second radio node 10 transmits a reference signal to be received by the receiving antenna ports of the first radio node. The reference signal will provide the first radio node with partial channel state information relevant for all radio links between the transmitting antenna port $T_1$, i.e., the transmitting antenna port that actively transmitted the reference signal, and the set of receiving antenna ports $R_i$, i=1, . . . N. That is, the channel state information relates to (1×N) radio links. Since the maximum number of possible radio links between the first radio node 1 and the second radio node 10 amounts to (M×N), i.e., the number of transmitting antenna ports times the number of receiving antenna ports, the partial channel state information obtained from the reference signal is merely a fraction of the relevant channel state information. The proposed procedure will however utilize the partial channel state information together with particular assignment models in order to provide channel state information estimates for the remaining unknown radio links. The assignment models used are models that assign measures, or values, to the unknown links based on the partial channel information that was obtained. As such it models the unknown propagation channels between transmitting antenna ports and receiving antenna ports based on information obtained from the signaling phase in order to assign measure or values to the propagation channels between the passive antenna ports, i.e., those antenna ports that did not participate in the transmission of the reference signal, and the actively receiving antenna ports. A particular basis for the measure assignment model relates to the case where the transmitting second radio node 20 are assumed to have antennas of two orthogonal polarizations, and hence the complimentary channel pair in a 2-antenna is orthogonal to the transmitting antenna. The assignment model may also be selected based on certain assumption regarding the spatial extension of transmitting antenna ports $T_i$ of the second radio node. With the terms measures or values are here intended information that relates to the amplitudes and the phases of signals on the unknown radio links. The measure of a particular channel between a receiving antenna port $R_i$ and a transmitting antenna port $T_j$ can be written as, [A+Bj] where A provides information about the amplitude of the signal, j is a complex number which together with B provides phase information for the signal. So the assignment model assigns information relating to the amplitude and/or phase of signals on the unknown radio links. The assignment model(s) will be described in more detail in what follows.

Figure 1:
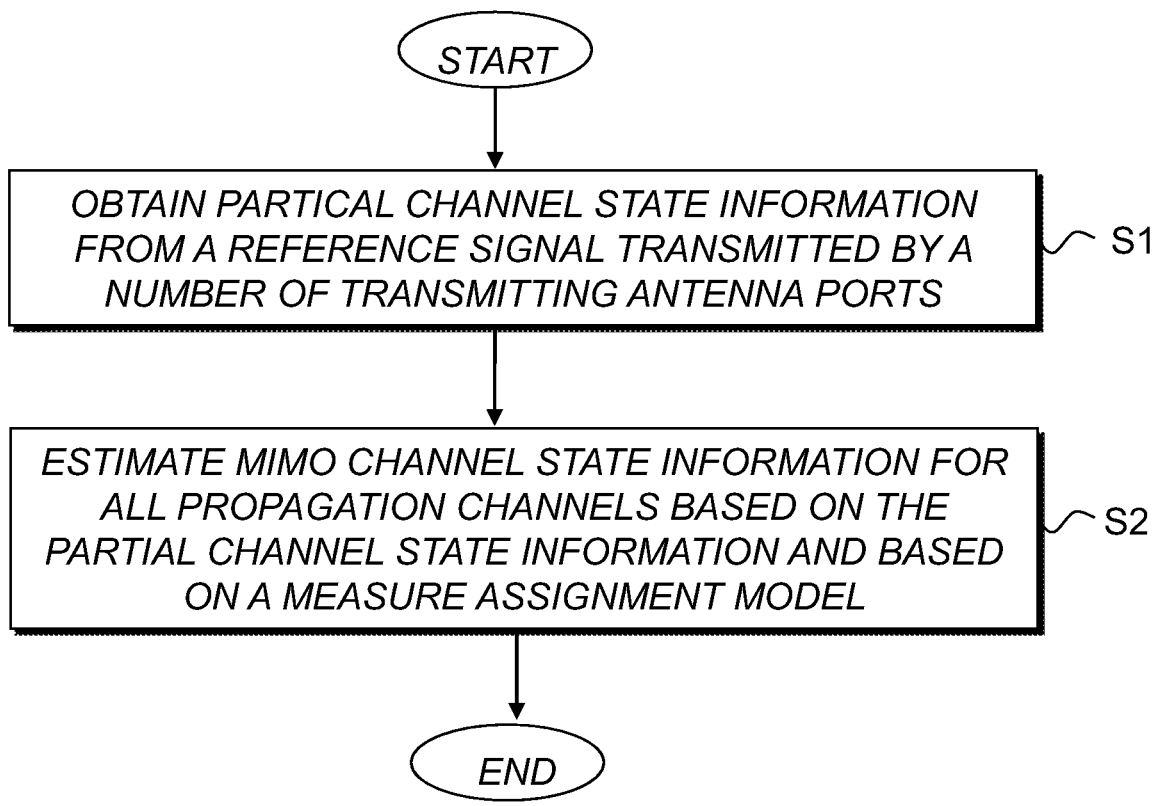
FIG. 1 is a schematic flow diagram illustrating a method for estimating MIMO channel state information according to the proposed technology.

FIG. 1 is a flow diagram that schematically illustrates a method for estimating Multiple Input Multiple Output, MIMO, channel state information for a radio link between a first radio node 1 comprising a number N, N≥2, of receiving antenna ports $R_i$, i=1, . . . N and a second radio node 10 comprising a number M, M≥2, of transmitting antenna ports $T_i$, i=1, . . . M. The method comprises the step of obtaining S1 partial channel state information from a reference signal transmitted by a number X, 1≤X<M, of the transmitting antenna ports $T_{i=1, 2 \ldots X}$ and received by all of the receiving antenna ports $R_i$. The partial channel state information providing a measure for the (N×X) propagation channels between all of the receiving antenna ports $R_i$ and the transmitting antenna ports $T_{i=1,2 \ldots X}$. The method also comprises the step of estimating S2 MIMO channel state information for all N×M propagation channels between the receiving antenna ports $R_i$ and the transmitting antenna ports $T_{i=1, 2 \ldots X}$ based on:

at least one measure assignment model that assign measures to the propagation channels between all of the receiving antenna ports $R_i$ and the remaining number of transmitting antenna ports $T_{i \neq 1, 2 \ldots X}$ that did not transmit the reference signal, and the obtained partial channel state information.

In other words, the method obtains partial channel information relating to the propagation channels that can be detected when the second radio node 20, e.g., a UE transmits a reference signal in a radio link, e.g., an uplink, UL, from a number X of transmitting antenna ports. Note that the reference signal may be any received signal that can be used for channel estimation, e.g., a sounding reference signals, SRS, but also a DeModulation Reference Signal, DMRS, etc., note also that the number X of transmitting antenna ports is smaller than the number of antenna ports that could potentially transmit the reference signal. Based on the received reference signal the first radio node 1, e.g., an eNodeB, obtains measures or estimates of the propagation channels from the X transmitting antenna ports used in the signaling phase, e.g., the sounding phase and the N receiving antenna ports. This provides the first radio node 1 with partial channel state information that relates to measures indicative of the channel state for the X×N radio links or propagation channels between the transmitting antenna ports and the receiving antenna ports.

At this stage a model is assumed for the propagation channels between the remaining (M–X) transmitting antenna ports and the N receiving antenna ports. The model comprises a measure assignment model which utilizes the partial channel state information obtained from the signaling phase to assign values to the channels between the passive antenna ports, i.e., those transmitting antenna ports that did not participate in the transmission of the reference signal, and the actively receiving antenna ports. A particular basis for choosing the measure assignment model relates to the case where the transmitting second radio node 20 are assumed to have antennas of two orthogonal polarizations, and hence that the complimentary channel pair in a 2-antenna is orthogonal to the one transmitting. This will be referred to as the orthogonal model. Another basis for choosing the measurement assignment model is the assumption that the transmitting antenna ports are arranged sufficiently close spatially whereby it can be assumed that the propagation channels to the receiving antenna ports are essentially the same as for the neighboring antenna, this will be referred to as the splitting model. How these models will be used to assign measures or values will be described in more detail below based on concrete examples.

Regardless of which measure assignment model that is used to estimate the unknown propagation channels it will be used together with the corresponding measures/values in the partial channel state information obtained in the signaling phase in order to extend or extrapolate the partial channel information to include all antenna port pairs, i.e., between all transmitting antenna ports and all receiving antenna ports.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

To clarify the proposed method even further a specific representation of the channel state information will be given. This representation is quite common within the technical field and comprises to represent the channel state information by means of column vectors and matrices. This representation is particularly useful for describing how the measure assignment model is utilized, i.e., how it is applied on the matrix representation. The matrix representation, often referred to as the channel state information matrix, is however merely a specific way to represent the channel state information and other representations may very well be more suitable for implementing the method in e.g., a computer program.

We therefore begin with a brief explanation on how the channel state information can be represented by means of column vectors and matrices. Consider the following simple example relating to the case with a pair of transmitting- and receiving antenna ports. In the most tractable case, the second radio node 10, e.g., a User Equipment, transmits reference signal(s) from both antenna 1 and antenna 2. The first radio node, e.g., an eNodeB, receives the reference signals on antenna 1 and antenna 2. In such a scenario the complete channel state information can of course be extracted without having to rely on the proposed estimation method. The channel state information obtained from the reference signal(s) can however be expressed as a matrix, i.e., be given a matrix representation, in the following form.

$$H = \begin{bmatrix} h_{1,1} & h_{1,2} \\ h_{2,1} & h_{2,2} \end{bmatrix}$$

Individual matrix elements $h_{ij}$ relates to the channel between a receiving antenna port i and a transmitting antenna port j. A column vector in the matrix H represents all the propagation channels between a specific transmitting antenna port and the receiving antennas.

According to a scenario relevant for the proposed technology only one of the radio nodes, e.g., the second radio node, will transmit the reference signals from a single transmitting antenna port, let's say antenna 1. In such a scenario, the first radio node is only able to obtain partial channel state information for the propagation channels between receiving antenna 1 and transmitting antenna 1, denoted $h_{11}$, and from receiving antenna 2 to transmitting antenna 2, denoted $h_{21}$. The partial channel information obtained in this way can be expressed as a matrix in the following form:

$$H_P = \begin{bmatrix} h_{1,1} & ? \\ h_{2,1} & ? \end{bmatrix}$$

The question marks in the second column represent the unknown channel state information between the second transmitting antenna and the receiving antennas and $H_p$ denotes the matrix representation for the obtained partial channel state information. The provided matrix representation is easily generalized to any number of transmitting antenna ports and receiving antenna ports.

The particular channel that is known in $H_p$ above provides severe restrictions to the radio node. It only enables precoding of one spatial data stream, which hence would lead to potentially half the data rate and it also provides restrictions on e.g., scheduling and link adaption. The main object of the proposed technology is to extend $H_p$ in order to obtain a larger matrix $H_{kl}$ that provides estimates for all propagation channels, i.e., all propagation channels between the transmitting antenna ports and receiving antenna ports.

Figure 2:
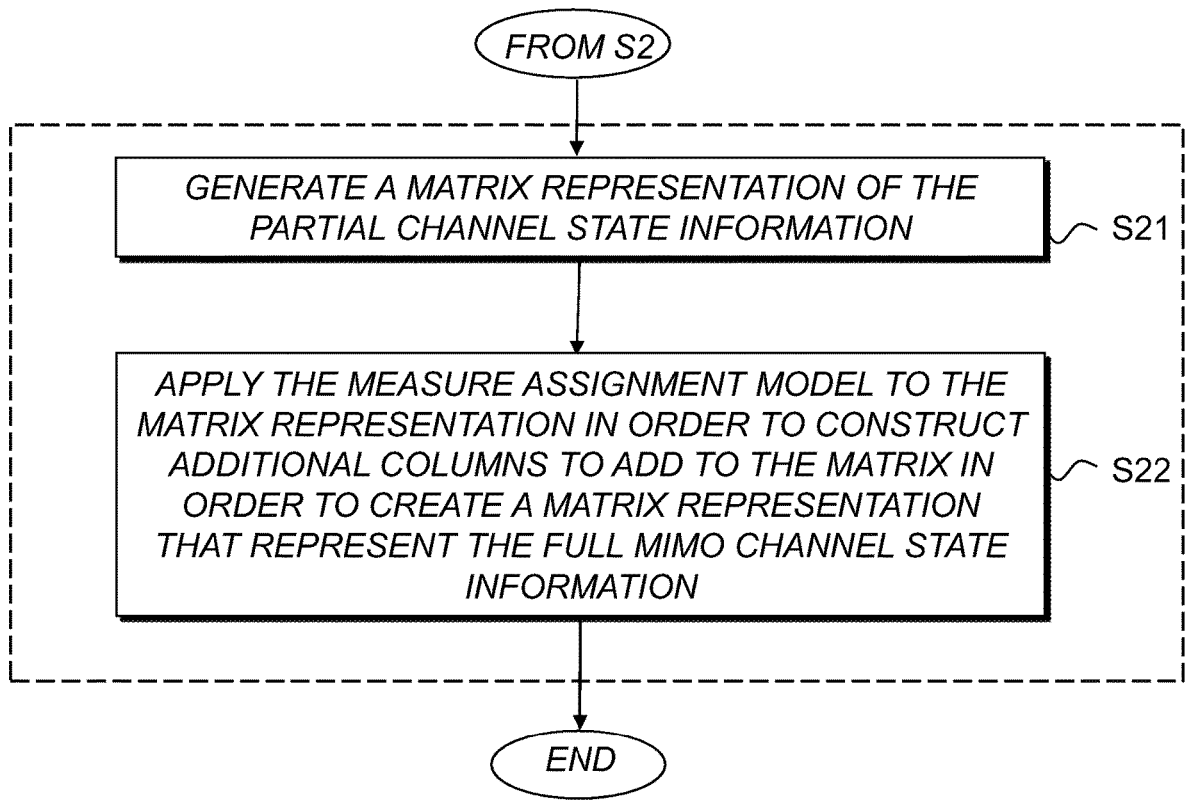
FIG. 2 is a schematic flow diagram illustrating an embodiment of a method for estimating MIMO channel state information according to the proposed technology

According to a particular embodiment of the proposed technology there is provided a method wherein the step S2 of estimating MIMO channel state information for all N×M propagation channels comprises the step of generating S21 a representation of the N×X propagation channels in the form of a (N×X) matrix $H_{KL}$, where a particular column of the matrix $H_{KL}$ contains measures, obtained from the partial channel information, about the propagation channels between a corresponding transmitting antenna port $T_i=L$ and the receiving antenna ports $R_{i=1 \ldots K}$. The method also comprises the step of applying S22 the measure assignment model to the generated matrix $H_{KL}$ in order to construct additional columns to add to the matrix in order to create a (N×M) matrix representing an estimate of the full MIMO channel state information. The additional columns being constructed based on the columns belonging to the (N×X) matrix $H_{KL}$ and provides estimates of the propagation channels between the receiving antenna ports $R_{i=1 \ldots K}$ and the transmitting antenna ports $T_{i\neq 1, 2 \ldots x}$ that did not transmit the reference signal. FIG. 2 provides a schematic flow diagram illustrating this embodiment.

In other words, there is provided a method where the partial channel state information that was obtained from the reference signal is used to generate S21 a matrix $H_{KL}$. The dimension of this particular matrix depends on the number of receiving antennas and the number of transmitting antennas that were active during the transmission of the reference signal. In the general case with N receiving antenna ports and a number X of transmitting antennas, selected from a number M of potentially transmitting antenna ports, the matrix $H_{KL}$ will be a N×X matrix. This matrix will only provide a representation of the partial channel state information. The method aims however to generate a representation of the complete channel state information, i.e., a matrix representing all the N×M propagation channels. In order to extend the initially generated matrix $H_{KL}$ to a N×M matrix the columns of $H_{KL}$ will be used to generate additional columns that will be added to the matrix. The number of columns that needs to be created depends on the number X of transmitting antennas that were active during the transmission of the reference signal and the number M of potentially transmitting antennas. In the general case M−X additional columns are needed. The additional columns are thus created based on measures already known from the partial channel state information and based on the measure assignment model use. The measure assignment model will thus create a mapping from a set of known column vectors to a new set of additional column vectors. There are at least two functional forms of mapping that can be used. A first one, referred to as the orthogonal model and a second one, referred to as the splitting model. Particulars of these models will be described below.

Figure 3:
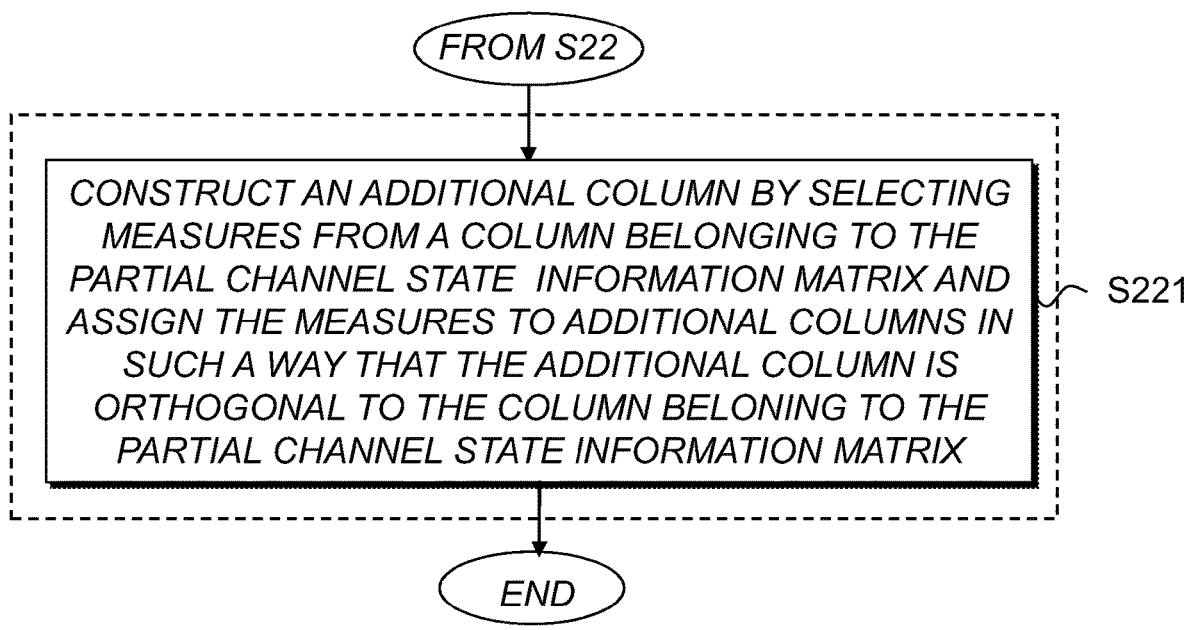
FIG. 3 is a schematic flow diagram illustrating yet another embodiment of a method for estimating MIMO channel state information according to the proposed technology.

According to particular embodiment of the proposed technology, illustrated in the flow diagram of FIG. 3, there is provided a method wherein the step of applying S22 the measure assignment model comprises the step of constructing S221 an additional column by selecting particular measures from a corresponding column belonging to the generated matrix $H_{KL}$, and assigning the selected measures to the additional column in such a way that the additional column is orthogonal to the corresponding column belonging to the generated matrix $H_{KL}$. This embodiment utilizes the measure assignment model referred to as the orthogonal model above. The model is based on an assumption that transmitting antennas are arranged close to each and utilizes two orthogonal polarizations. It is therefore possible to assume that the channels to/from the transmitting antennas are orthogonal Consider the following example of the model where an arbitrary number of antenna ports at the first radio node, receive, from one of the second radio nodes transmitting antenna, the vectors:

$H_{pol1}$ and $H_{pol2}$ (having size equal to the number of cross polarized antenna×1), forming the first column of the matrix. Based on this it is possible to generate an additional column that depend on the measures provided by $H_{pol1}$ and $H_{pol2}$ and that are orthogonal to the known column, symbolically: Then, we can reconstruct the full rank channel as, for example, $$H_P = \begin{bmatrix} H_{pol1} & ? \\ H_{pol2} & ? \end{bmatrix} \rightarrow \tilde{H}_{ext} = \begin{bmatrix} H_{pol1} & H_{pol2} \\ H_{pol2} & -H_{pol1} \end{bmatrix}$$

The full rank channel state information has thus been generated based on the obtained partial channel state information and based on a measure assignment model where the generated columns are constructed so that they are orthogonal to the initial column(s). Alternatively stated, the unknown channel estimates can be replaced by manipulated versions of the known estimates.

The example above can also be used as an illustration for the case where the transmitting radio node is transmitting with half of its antenna ports. For instance if the radio node has two X-polarized antennas and uses only one pair of same-polarization antennas ports for transmission. The $H_{Pol1}$ and $H_{Pol2}$ in the above matrix expression can then be defined as any matrix size (N*M/2), and not only vectors. This also holds for the example relating to the columns splitting model provide below.

According to yet another embodiment of the proposed technology there is provided a method wherein the step S221 of constructing an additional column is repeated for all transmitting antenna ports $T_{i\neq 1, 2 \ldots x}$ that did not transmit the reference signal in order to create a (N×M) matrix representing an estimate of the full MIMO channel state information. In other words by ensuring that all the additional columns are orthogonal it will be possible to generate an estimate of the full MIMO channel state information. The particular embodiments where a number of additional columns are created based on an orthogonalization scheme is highly effective since it is computationally undemanding.

Another highly effective method is provided by an alternative embodiment of the proposed technology. This method utilizes a measure assignment model that is based on column splitting. According to the proposed method, the step of applying S22 the measure assignment model comprises using a column splitting model where components of columns belonging to the generated matrix $H_{KL}$ are used to construct additional columns. An additional embodiment of the proposed technology provides a method wherein the column splitting model also comprises to set the components used to construct the additional columns to zero in the columns belonging to the generated matrix $H_{KL}$.

To illustrate the column splitting model consider the same example as was given above, i.e., an arbitrary number of antenna ports at the first radio node, receive, from one of the second radio nodes transmitting antenna, the vectors: $H_{pol1}$ and $H_{pol2}$ (having size equal to the to the number of cross polarized antenna×1), forming the first column of the matrix. Based on this it is possible to generate an additional column by utilizing components of the initial column, i.e., $H_{pol1}$ and $H_{pol2}$, to generate an additional column followed by setting the component of the initial column to zero. Symbolically this is given by:

$$H_P = \begin{bmatrix} H_{pol1} & ? \\ H_{pol2} & ? \end{bmatrix} \rightarrow \tilde{H}_{split} = \begin{bmatrix} H_{pol1} & 0 \\ 0 & H_{pol2} \end{bmatrix}$$

This particular assignment model is thus based on a splitting of the known channel estimate vectors and an assumption that each separate part emanates from another transmitting antenna port. This method is very fast and computationally undemanding since the assignment model hardly computes anything, instead it adjusts and distributes already known vector components, i.e., already known matrix elements in order to extend the initially known matrix into a matrix that provides a representation of the estimated full MIMO channel state information.

In order to further clarify the proposed technology, below there is provided a number of additional examples.

As a first example, consider the case where a known N×1 channel matrix is transformed to an N×M-matrix, M<N. In this scenario it is possible to use a measure assignment model that comprises column splitting to transform the original H into an extended H, for example in the following manner.

$$H_P = \begin{bmatrix} H_1 & ? & \cdots & ? \\ H_2 & ? & \cdots & ? \\ \vdots & \vdots & \ddots & \vdots \\ H_M & ? & \cdots & ? \end{bmatrix} \rightarrow \tilde{H}_{split} = \begin{bmatrix} H_1 & 0 & \cdots & 0 \\ 0 & H_2 & \cdots & 0 \\ \vdots & \vdots & \ddots & 0 \\ 0 & 0 & 0 & H_m \end{bmatrix}$$

Yet another example relates to the case were multiple channels are known and multiple additional channels are to be constructed based on the known channels. Assume for example the case of a second radio node 10 having 2 cross-polarized antennas, i.e., 4 elements, but only uses 2 elements for transmission. All the methods mentioned above can be used and/or combined in order to extend the known matrix into a matrix that provides a representation of the full MIMO channel state information.

For instance, by using the orthogonal model:

$$H_P = \begin{bmatrix} H_{1,1} & H_{1,2} & ? & ? \\ H_{2,1} & H_{2,2} & ? & ? \\ H_{3,1} & H_{3,2} & ? & ? \\ H_{4,1} & H_{4,2} & ? & ? \end{bmatrix} \rightarrow \tilde{H}_{rec} = \begin{bmatrix} H_{1,1} & H_{1,2} & H_{2,1} & H_{2,2} \\ H_{2,1} & H_{2,2} & -H_{1,1} & -H_{1,2} \\ H_{3,1} & H_{3,2} & H_{4,1} & H_{4,2} \\ H_{4,1} & H_{4,2} & -H_{3,1} & -H_{3,2} \end{bmatrix}$$

Or by using the column splitting model:

$$H_P = \begin{bmatrix} H_{1,1} & H_{1,2} & ? & ? \\ H_{2,1} & H_{2,2} & ? & ? \\ H_{3,1} & H_{3,2} & ? & ? \\ H_{4,1} & H_{4,2} & ? & ? \end{bmatrix} \rightarrow \tilde{H}_{rec} = \begin{bmatrix} H_{1,1} & H_{1,2} & 0 & 0 \\ 0 & 0 & H_{2,1} & H_{2,2} \\ H_{3,1} & H_{3,2} & 0 & 0 \\ 0 & 0 & H_{4,1} & H_{4,2} \end{bmatrix}$$

Yet another example relates to the case where three transmitting antenna ports transmits the reference signal and four receiving antenna ports are used. In this example the initial matrix $H_{kl}$ can be extended to the full channel state information matrix by using the splitting model, symbolically:

$$\begin{bmatrix} h_{11} & h_{12} & h_{13} & ? \\ h_{21} & h_{22} & h_{23} & ? \\ h_{31} & h_{32} & h_{33} & ? \\ h_{41} & h_{42} & h_{43} & ? \end{bmatrix} \rightarrow \begin{bmatrix} 0 & h_{12} & h_{13} & h_{11} \\ h_{21} & 0 & h_{23} & h_{22} \\ h_{31} & h_{32} & 0 & h_{33} \\ h_{41} & h_{42} & h_{43} & 0 \end{bmatrix},$$

where $h_{RT}$ can be a vector containing multiple antenna ports.

According to a particular embodiment of the proposed method the first radio node 1 comprises a network node and the second radio node 10 comprises a User Equipment and the reference signal comprises an uplink sounding signal. The network node may for example be an eNodeB.

According to yet another embodiment of the proposed technology the method may be performed by the network node 1.

According to still another embodiment of the proposed technology the method may be performed by a network device 100. This network device may for example be a cloud-based network device.

Having provided a number of embodiments and examples of a method for estimating MIMO channel state information it should also be noted that the described method may be part of a method for controlling transmissions. To this end the proposed technology also provides a method for controlling a transmission comprising the earlier describe method for estimating MIMO channel state information.

Consider for example that an additional channel has been obtained by means of the method for estimating MIMO channel state information. This channel can now be used for precoding calculations, scheduling, link adaptation, etc. as any other CSI matrix, independently of how it was obtained and thus can utilizes all degrees of freedom in the channel.

The precoder may for example utilize information of the relative strength of the different spatial layers for power allocation. Heuristically, simulations have shown that the second layer is weaker than the first layer. This relative difference may however be site/case specific and can be tuned for a given scenario, and adaptively updated based on UE reports.

In a possible optional embodiment, the precoder calculation above may utilize an estimate of how well the estimated channel models the true channel and adjusts accordingly The proposed technology enable faster transmission of data to a receiving node due to higher spectral efficiency. It enables in particular faster downlink transmissions in the signal to noise ratio range, SNR range.

In a further possible optional embodiment a DL scheduling scheme/entity may utilize an estimate of how well the estimated channel models the true channel and adjusts accordingly.

In a further possible optional embodiment the DL link adaptation scheme/entity may utilize an estimate of how well the estimated channel models the true channel and adjusts accordingly The method for controlling a transmission may in an embodiment, where the estimated MIMO channel state information comprises an estimate of the full channel state information utilize the channel state information for at least one of the following:

precoding of antenna elements;
scheduling of traffic;
selection of transmission rank; and
link adaptation.

The method for controlling a transmission may in an embodiment, where the estimated MIMO channel state information comprises an estimate of the full Downlink, DL, channel state information utilize the full DL channel information for at least one of the following:

DL precoding of antenna elements;
scheduling of DL traffic;
selection of transmission rank; and
link adaptation.

Having described various embodiments of the proposed methods, and provided several examples illustrating their working in what follows we will describe a number of apparatuses and devices that can be used to perform the methods. In the earlier described method the participating network units were referred as a first and second radio node respectively. The general non-limiting term "radio node" or equivalently "radio network node" includes network nodes and/or associated wireless communication devices. As used herein, the non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication. As used herein, the non-limiting term "network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), gNodeBs, and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

As used herein, the term "network device" may refer to any device located in connection with a communication network, including but not limited to devices in access networks, core networks and similar network structures. The term network device may also encompass cloud-based network devices.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Advantages with the proposed technology have been described earlier in relation to the corresponding methods and the advantages are the same also for the devices and apparatuses that are configured to perform the methods. The advantages will not be described further.

According to an aspect of the proposed technology there is provided a network device 100 configured to estimate Multiple Input Multiple Output, MIMO, channel state information for a radio link between a first radio node 1 comprising a number N, N≥2, of receiving antenna ports $R_i$, i=1, . . . N, and a second radio node 10 comprising a number M, M≥2, of transmitting antenna ports $T_i$, i=1, . . . M. The network device 100 is configured to obtain partial channel state information from a reference signal transmitted by a number X, 1≤X<M, of the transmitting antenna ports $T_{i=1, 2 \ldots X}$ and received by all of the receiving antenna ports $R_i$, the partial channel state information providing a measure for the N×X propagation channels between all of the receiving antenna ports $R_i$ and the transmitting antenna ports $T_{i=1, 2 \ldots X}$. The network device 100 is also configured to estimate MIMO channel state information for all N×M propagation channels between the receiving antenna ports $R_i$ and the transmitting antenna ports $T_i$ based on at least one measure assignment model that assign measures to the propagation channels between all of the receiving antenna ports $R_i$ and the remaining number of transmitting antenna ports $T_{i \neq 1, 2 \ldots X}$ that did not transmit the reference signal, and based on the obtained partial channel state information.

A particular embodiment of the proposed technology provides a network device 1 that is configured to estimate MIMO channel state information for all N×M propagation channels. The network device 100 is configured to generate a representation of the N×X propagation channels in the form of a (N×X) matrix $H_{KL}$, where a particular column of the matrix $H_{KL}$ contains measures, obtained from the partial channel information, about the propagation channels between a corresponding transmitting antenna port $T_{i=L}$ and the receiving antenna ports $R_{i=1 \ldots K}$. The network device 100 is also configured to apply the measure assignment model to the generated matrix $H_{KL}$ in order to construct additional columns to add to the matrix in order to create a (N×M) matrix representing an estimate of the full MIMO channel state information, the additional columns being constructed based on the columns belonging to the (N×X) matrix $H_{KL}$ and provides estimates of the propagation channels between the receiving antenna ports $R_{i=1...K}$ and the transmitting antenna ports ($T_{i\neq 1, 2...X}$ that did not transmit the reference signal.

Another particular embodiment of the proposed technology provides a network device 100 that is configured to apply the measure assignment model by constructing an additional column by selecting particular measures from a corresponding column belonging to the generated matrix $H_{KL}$, and assigning the selected measures to the additional column in such a way that the additional column is orthogonal to the corresponding column belonging to the generated matrix $H_{KL}$.

Still another particular embodiment of the proposed technology provides a network device 100 that is configured to repeat the construction of an additional column for all transmitting antenna ports ($T_{i\neq 1, 2...X}$ that did not transmit the reference signal in order to create a (N×M) matrix representing an estimate of the full MIMO channel state information.

An alternative embodiment of the proposed technology provides a network device 100 that is configured to apply the measure assignment model by using a column splitting model where components of columns belonging to the generated matrix $H_{KL}$ are used to construct additional columns.

A particular embodiment of the proposed technology provides a network device 100 that is also configured to set the components used to construct the additional columns to zero in the columns belonging to the generated matrix $H_{KL}$.

Figure 6:
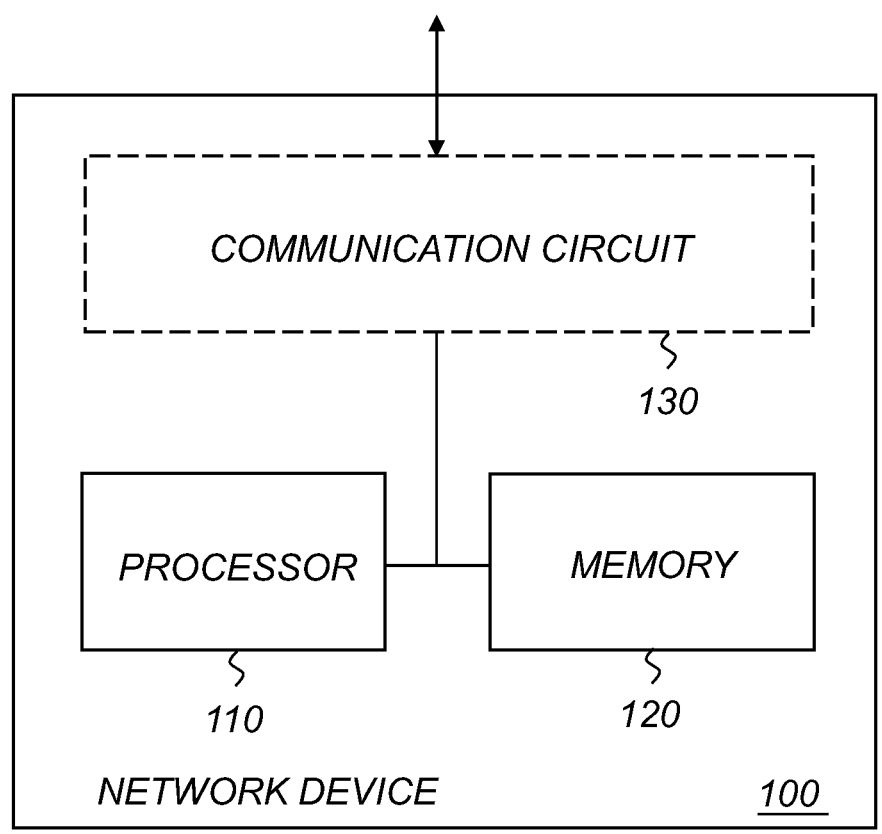
FIG. 6 is a schematic block diagram illustrating a network device according to the proposed technology.

FIG. 6 provides a block diagram illustration of a network device 100 according to the proposed technology. The network device comprises at least one processor 110; 210 and memory 120; 220, the memory comprising instructions, which when executed by the at least one processor, cause the at least one processor to estimate Multiple Input Multiple Output, MIMO, channel state information for a radio link between a first radio node 1 comprising a number N, N≥2, of receiving antenna ports $R_i$, i=1, ... N and a second radio node 10 comprising a number M, M≥2, of transmitting antenna ports $T_i$, i=1, ... M.

Optionally, the network device 100 may also include a communication circuit 130; 230. The communication circuit 130; 230 may include functions for wired and/or wireless communication with other devices and/or network nodes in the network. In a particular example, the communication circuit 130; 230 may be based on radio circuitry for communication with one or more other nodes, including transmitting and/or receiving information. The communication circuit 130 may be interconnected to the processor 110 and/or memory 120. The communication circuit 230 may be interconnected to the hardware circuitry 210 and/or REG/MEM 220. By way of example, the communication circuit 130; 230 may include any of the following: a receiver, a transmitter, a transceiver, input/output (I/O) circuitry, input port(s) and/or output port(s). A particular embodiment of the proposed technology therefore provides a network device 100 wherein the network device also comprises a communication circuit 130. Such an embodiment is illustrated in FIG. 6.

An embodiment of the proposed technology provides a network device 100 configured to estimate Multiple Input Multiple Output, MIMO, channel state information for between a first radio node 1 comprising a number N, N≥2, of receiving antenna ports $R_i$, i=1, ... N) and a second radio node 10 comprising a number M, M≥2, of transmitting antenna ports Ti, i=1, ... M, wherein the network device 100 comprises: a communication interface 130, memory 120, 220 and a processing circuitry 110, 210 configured to cause the network device 1 to:

obtain partial channel state information from a reference signal transmitted by a number X, 1≤X<M, of the transmitting antenna ports Ti=1, 2 ... X and received by all of the receiving antenna ports $R_i$, the partial channel state information providing a measure for the N×X propagation channels between all of the receiving antenna ports $R_i$ and the transmitting antenna ports Ti=1, 2 ... X; and estimate MIMO channel state information for all N×M propagation channels between the receiving antenna ports Ri and the transmitting antenna ports Ti based on:
  at least one measure assignment model that assign measures to the propagation channels between all of the receiving antenna ports $R_i$ and the remaining number of transmitting antenna ports Ti≠1, 2 ... X that did not transmit the reference signal, and
  the obtained partial channel state information.

Figure 7:
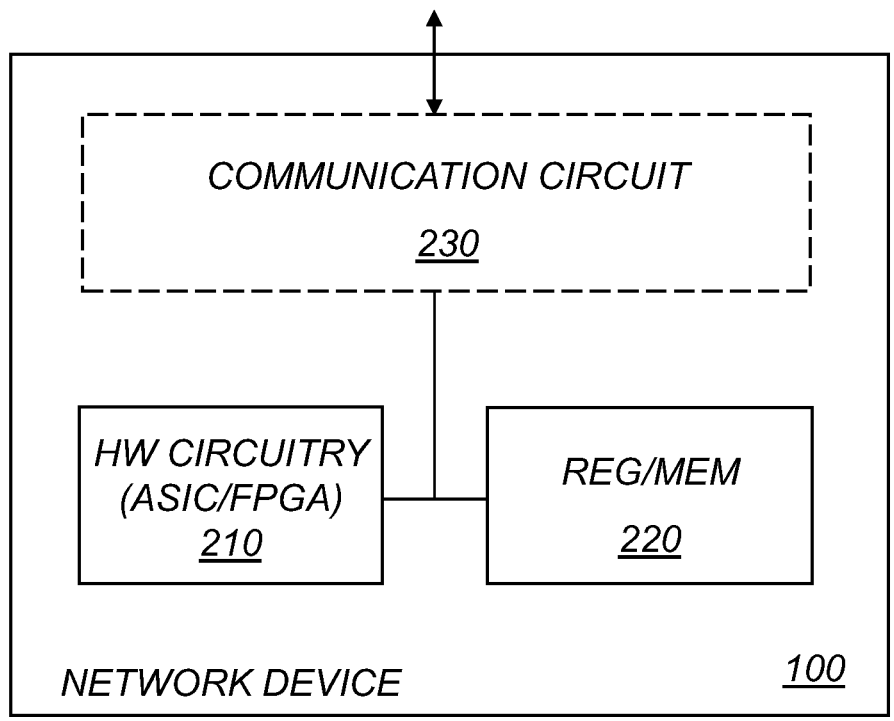
FIG. 7 is a schematic block diagram illustrating an alternative embodiment of a network device according to the proposed technology.

FIG. 7 is a schematic block diagram illustrating another example of a network device 100, based on a hardware circuitry implementation according to an embodiment. Particular examples of suitable hardware circuitry 210 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 220.

A particular embodiment of the proposed technology provides a network device 100 wherein the first radio node 1 comprises a network node and the second radio node 10 comprises a User Equipment and the reference signal comprises an uplink sounding signal.

A particular embodiment of the proposed technology provides a network node 1 comprising a network device 100 according to what has been described.

A particular embodiment of the proposed technology provides a network device 1000 configured to control transmissions, wherein the network device 1000 comprises a network device 100 that is configured to estimate MIMO channel state information according to what has been described above.

The proposed technology therefore provides for a particular embodiment where a network device, which can be a radio network node such as e.g., an eNodeB, that is configured to control transmissions wherein the network device, e.g., the network node, comprises a device that is configured to estimate MIMO channel state information according to what has been described herein. This latter network device may be network device with memory and processing circuitry but it may also be a cloud based network device. A cloud based device will be described in a later section.

It is also possible to provide a solution based on a combination of hardware and software. The actual hardware-software partitioning can be decided by a system designer based on a number of factors including processing speed, cost of implementation and other requirements.

Figure 8:
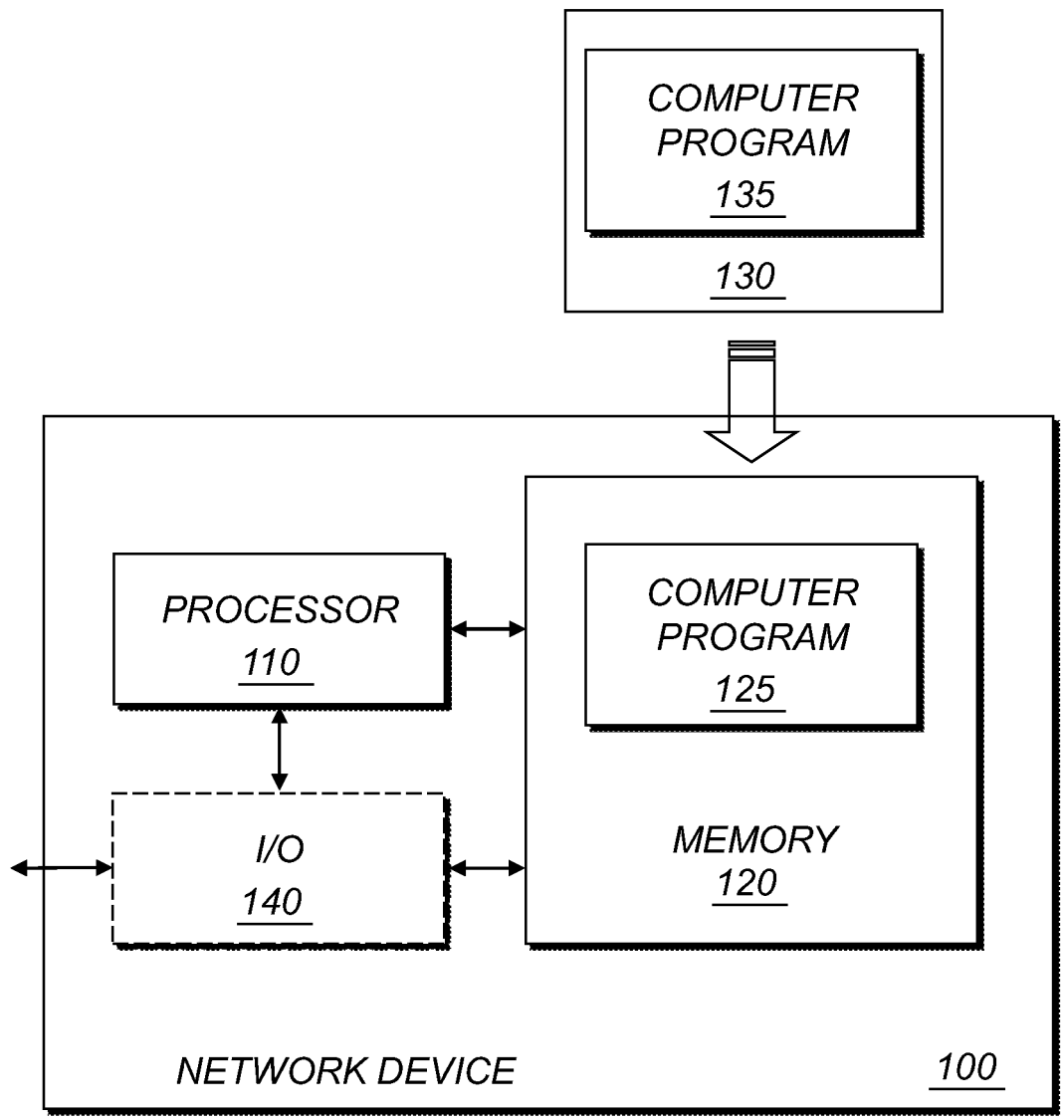
FIG. 8 is a schematic block diagram illustrating a computer program implementation according to the proposed technology.

FIG. 8 is a schematic diagram illustrating an example of a computer-implementation according to an embodiment of the proposed technology. In this particular example, at least some of the steps, functions, procedures, modules and/or blocks described herein are implemented in a computer program 125; 135, which is loaded into the memory 120 for execution by processing circuitry including one or more processors 110. The processor(s) 110 and memory 120 are interconnected to each other to enable normal software execution. An optional input/output device 140 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 110 is thus configured to perform, when executing the computer program 125, well-defined processing tasks such as those described herein.

The processing circuitry does not have to be dedicated to only execute the above-described steps, functions, procedure and/or blocks, but may also execute other tasks.

According to a particular embodiment of the proposed technology there is provided, a computer program 125; 135 for estimating, when executed, Multiple Input Multiple Output, MIMO, channel state information for a radio link between a first radio node 1 comprising a number N, N≥2, of receiving antenna ports $R_i$, i=1, ... N and a second radio node 10 comprising a number M, M≥2, of transmitting antenna ports $T_i$, i=1, ... M, wherein the computer program 125; 135 comprises instructions, which when executed by at least one processor 110, cause the at least one processor to:

read partial channel state information obtained from a reference signal transmitted by a number X, 1≤X<M, of the transmitting antenna ports $T_{i=1, 2 \ldots X}$ and received by all of the receiving antenna ports $R_i$, the partial channel state information providing a measure for the N×X propagation channels between all of the receiving antenna ports $R_i$ and the transmitting antenna $T_{i=1, 2 \ldots X}$; and estimate MIMO channel state information for all N×M propagation channels between the receiving antenna ports $R_i$ and the transmitting antenna ports $T_i$ based on at least one measure assignment model that assign measures to the propagation channels between all of the receiving antenna ports $R_i$ and the remaining number of transmitting antenna ports $T_{i \neq 1, 2 \ldots X}$ that did not transmit the reference signal, and based on the obtained partial channel state information; and output a representation of the estimate of the MIMO channel state information for all N×M uplink propagation channels.

The proposed technology also provides a carrier containing the above described computer program, where the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 9:
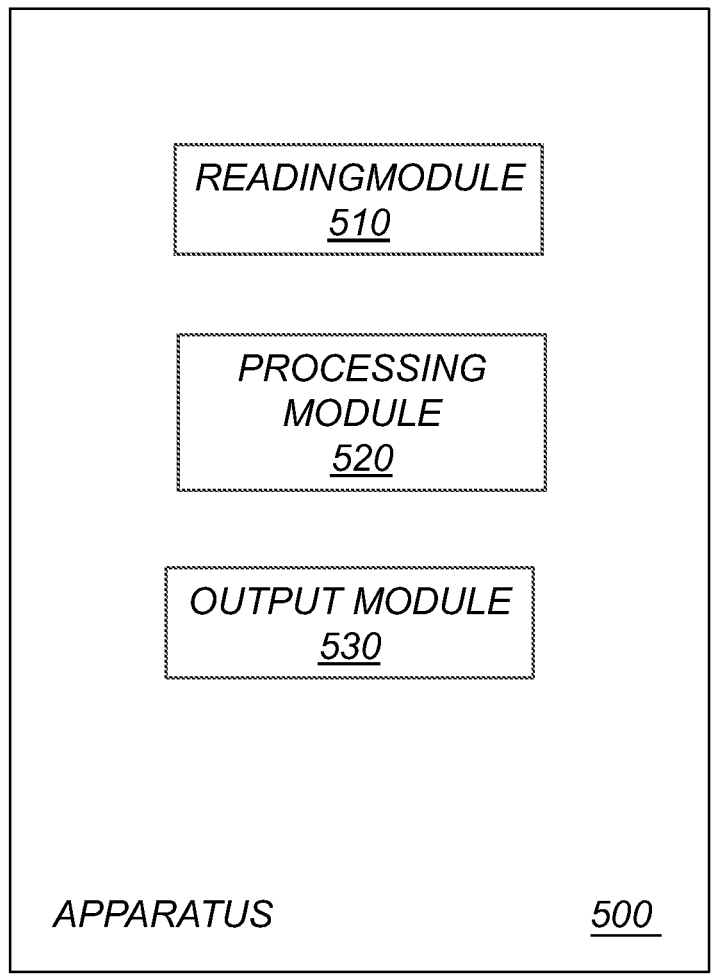
FIG. 9 is a schematic block diagram illustrating an apparatus according to the proposed technology.

FIG. 9 is a schematic diagram illustrating an example of an apparatus 500 for estimating, when executed, full rank Multiple Input Multiple Output, MIMO, channel state information for a radio link between a first radio node 1 comprising a number N, N≥2, of receiving antenna ports $R_i$, i=1, ... N, and a second radio node 10 comprising a number M, M≥2, of transmitting antenna ports $T_i$, i=1, ... M, wherein the apparatus comprises:

a reading module 510 for reading partial channel state information obtained from a reference signal transmitted by a number X, 1≤X<M, of the transmitting antenna ports $T_{i=1, 2 \ldots X}$ and received by all of the receiving antenna ports $R_i$, the partial channel state information providing a measure for the N×X propagation channels between all of the receiving antenna ports $R_i$ and the transmitting antenna $T_{i=1, 2 \ldots X}$; and a processing module 520 for estimating MIMO channel state information for all N×M uplink propagation channels between the receiving antenna ports $R_i$ and the transmitting antenna ports $T_i$ based on at least one measure assignment model that assign measures to the propagation channels between all of the receiving antenna ports $R_i$ and the remaining number of transmitting antenna ports $T_{i \neq 1,2 \ldots X}$ that did not transmit the reference signal, and base on the obtained partial channel state information; and an output module 530 for outputting a representation of the estimate of the MIMO channel state information for all N×M propagation channels.

Alternatively it is possible to realize the module(s) in FIG. 9 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The network device 100 may be any suitable network device in the wireless communication system, or a network device in connection with the wireless communication system. By way of example, the network device may be a suitable network node such a base station or an access point. However, the network device may alternatively be a cloud-implemented network device.

Figure 12:
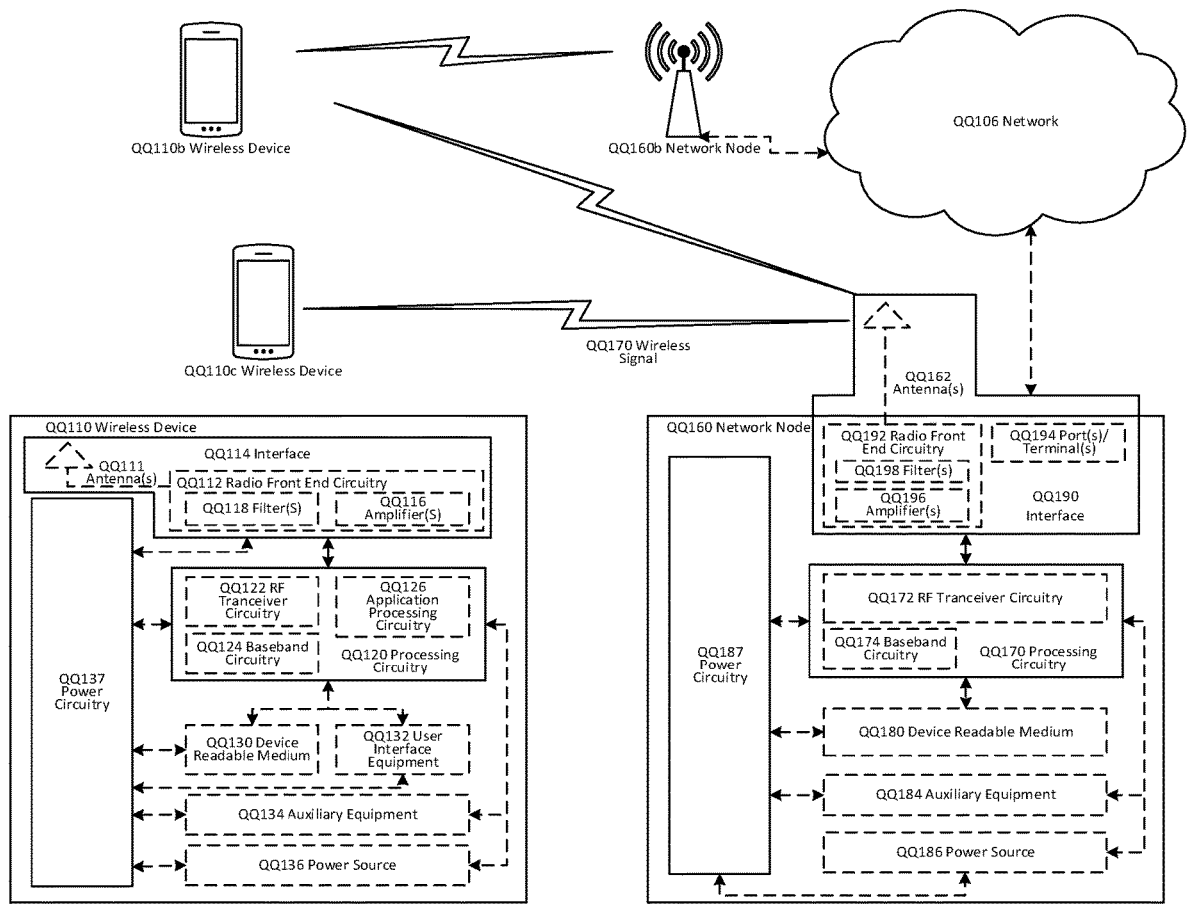
FIG. 12 is a schematic diagram illustrating an example of a wireless network in accordance with some embodiments

By way of example, "virtual" apparatuses may be implemented in a wireless device or network node (e.g., wireless device QQ110 or network node QQ160 shown in FIG. 12). The apparatus is operable to carry out the example method described herein, e.g. with reference to FIG. 1 and possibly any other processes or methods disclosed herein. It is also to be understood that the method of FIG. 1 is not necessarily carried out solely by the apparatus in FIG. 9. At least some operations of the method can be performed by one or more other entities.

For example, the virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
  Consolidation of network functionality into virtualized software running on customized or generic hardware. This is sometimes referred to as network function virtualization.
  Co-location of one or more application stacks, including operating system, running on separate hardware onto a single hardware platform. This is sometimes referred to as system virtualization, or platform virtualization.
  Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 10:
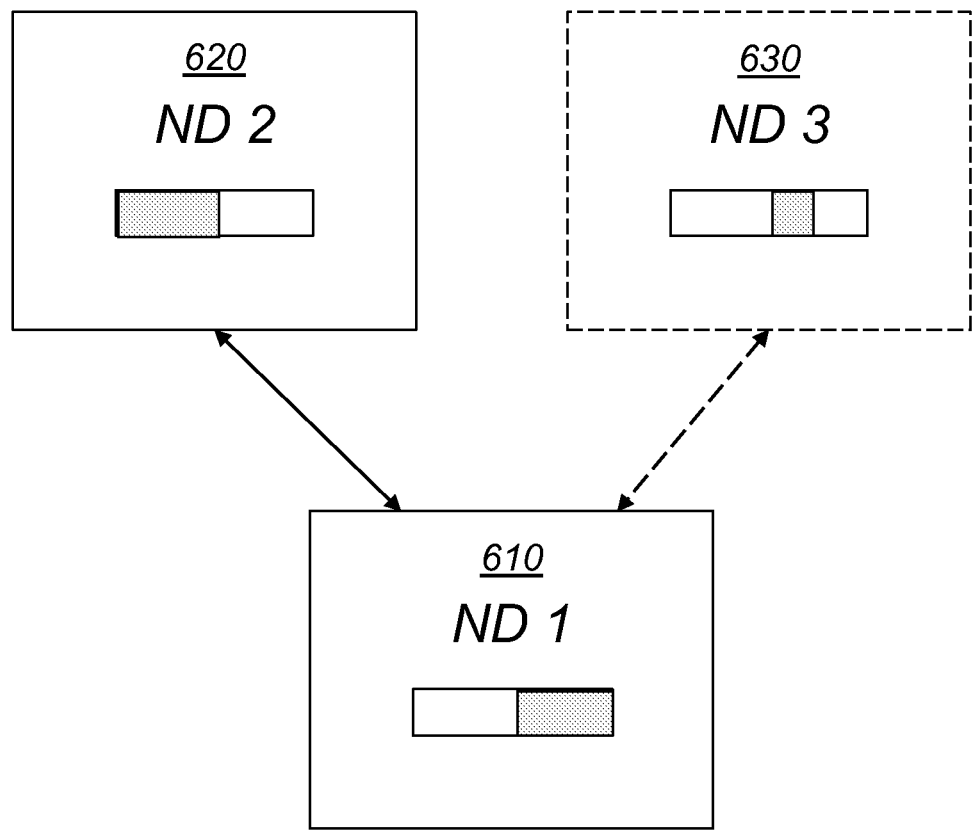
FIG. 10 is a schematic diagram illustrating an example of how functionality can be distributed or partitioned between different network devices

FIG. 10 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 11:
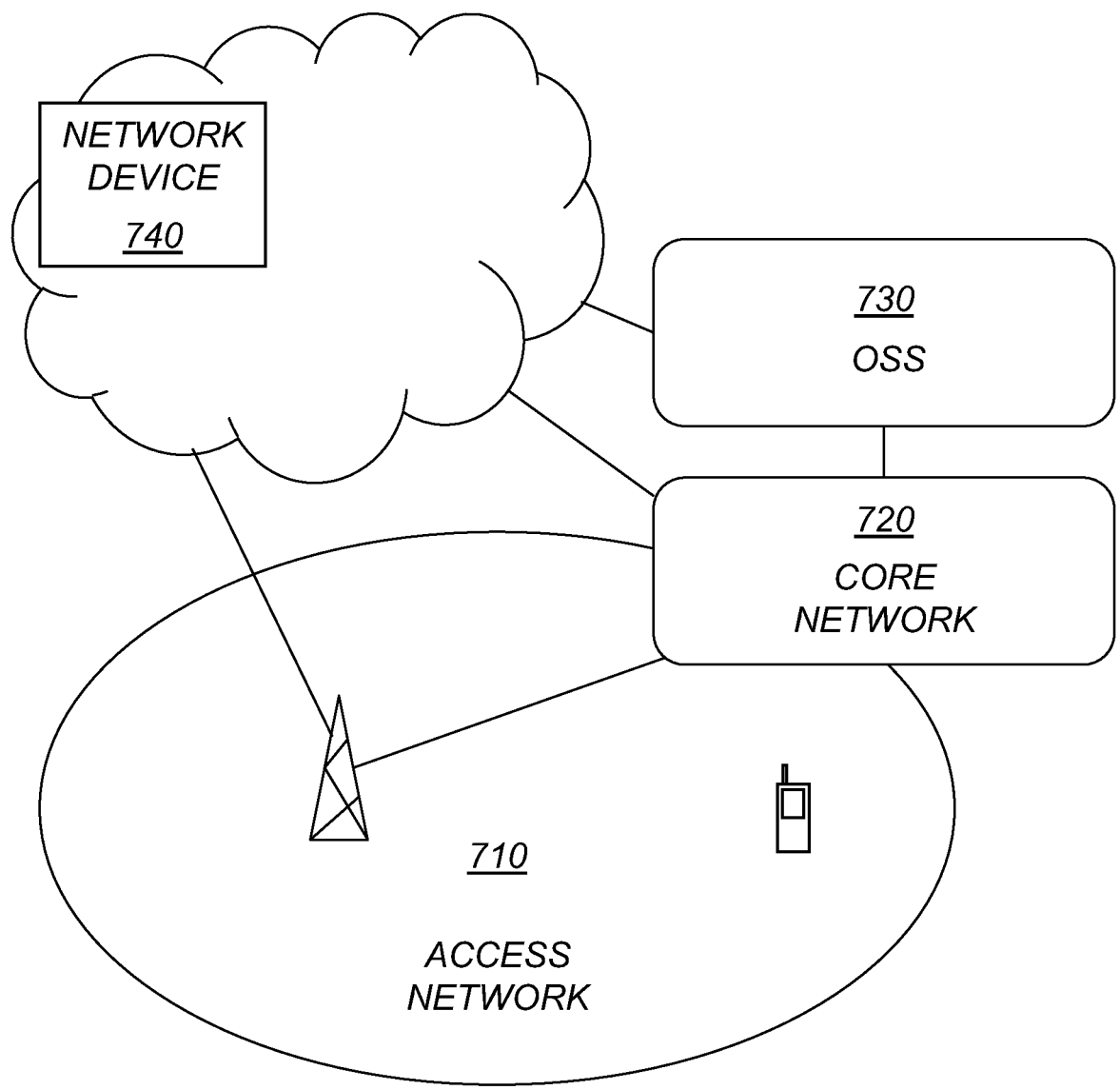
FIG. 11 is a schematic diagram illustrating an example of a wireless communication system, including an access network and/or a core network and/or an Operations and Support System (OSS), in cooperation with one or more cloud-based network devices.

FIG. 11 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 12-18.

FIG. 12 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 12 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc . . . . A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 13:
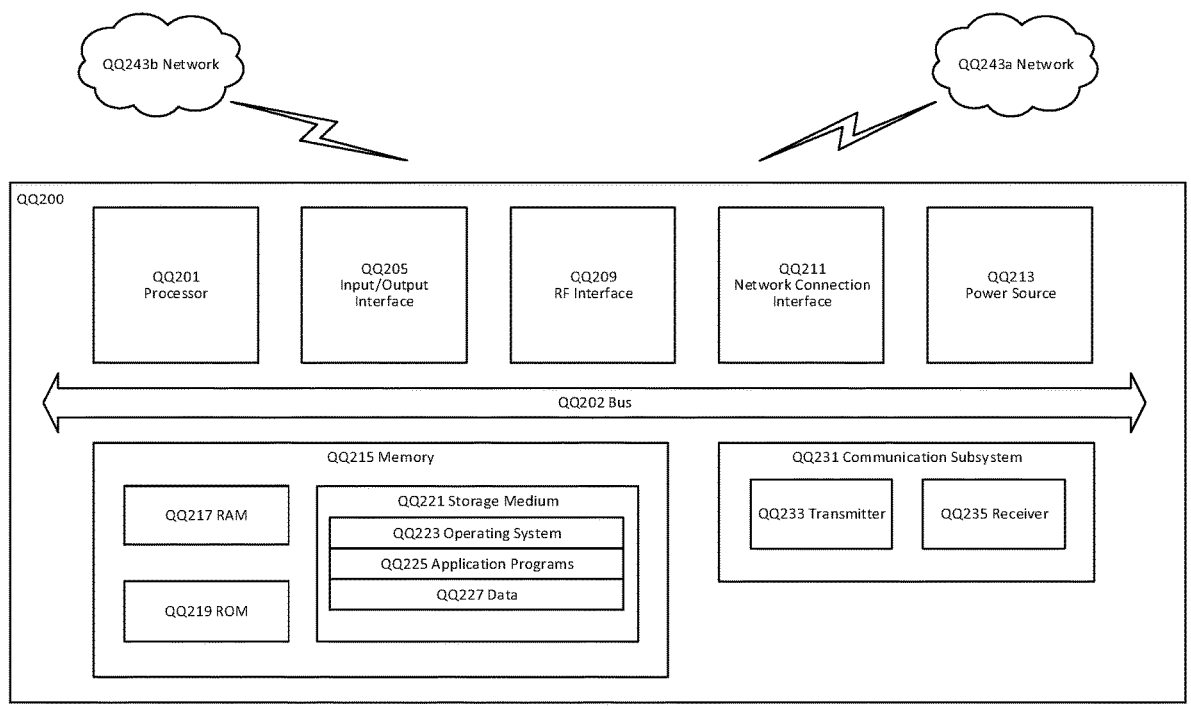
FIG. 13 is a schematic diagram illustrating an example of an embodiment of a UE in accordance with various aspects described herein

FIG. 13 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 13, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 13, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 14:
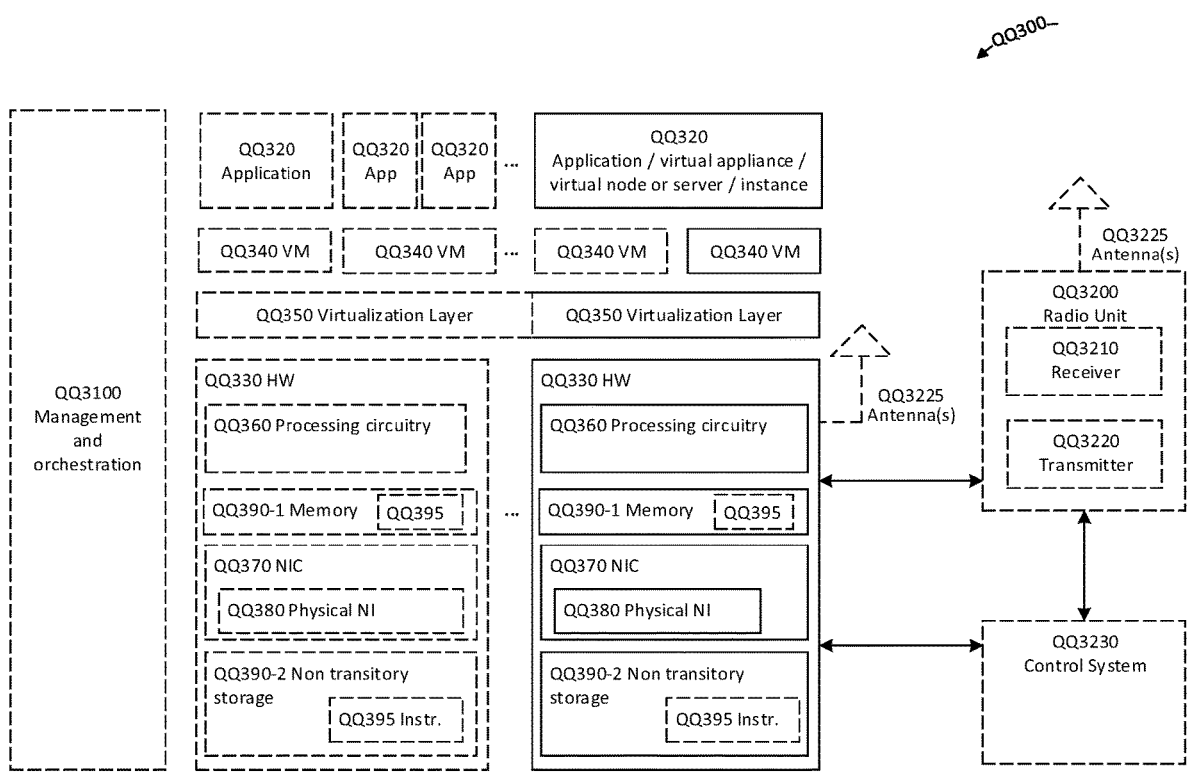
FIG. 14 is a schematic block diagram illustrating an example of a virtualization environment in which functions implemented by some embodiments may be virtualized.

FIG. 14 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 14, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 14.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 15:
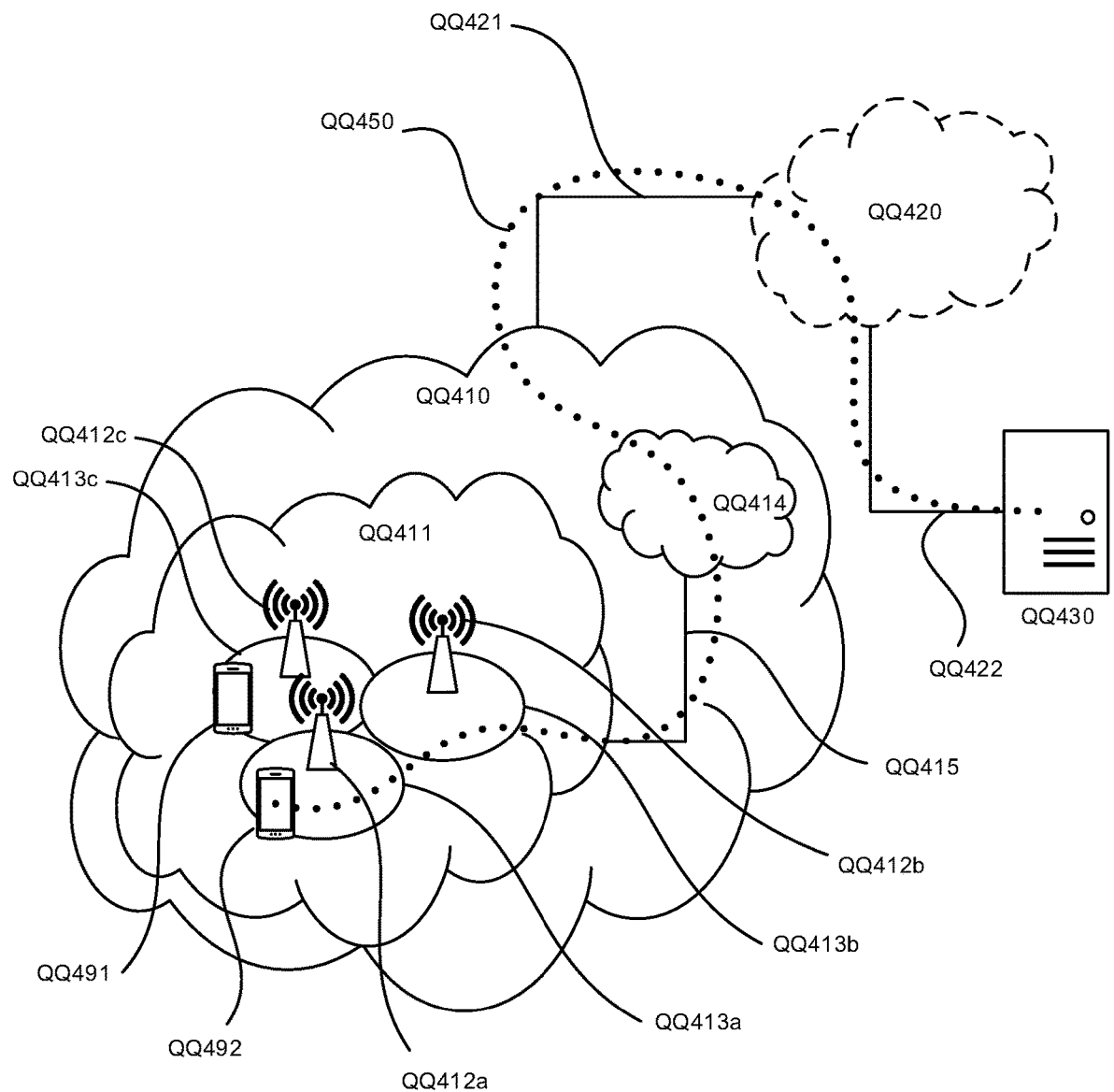
FIG. 15 is a schematic diagram illustrating an example of a telecommunication network connected via an intermediate network to a host computer in accordance with some embodiments.

FIG. 15 is a schematic diagram illustrating an example of a telecommunication network connected via an intermediate network to a host computer in accordance with some embodiments.

With reference to FIG. 15, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 15 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 16:
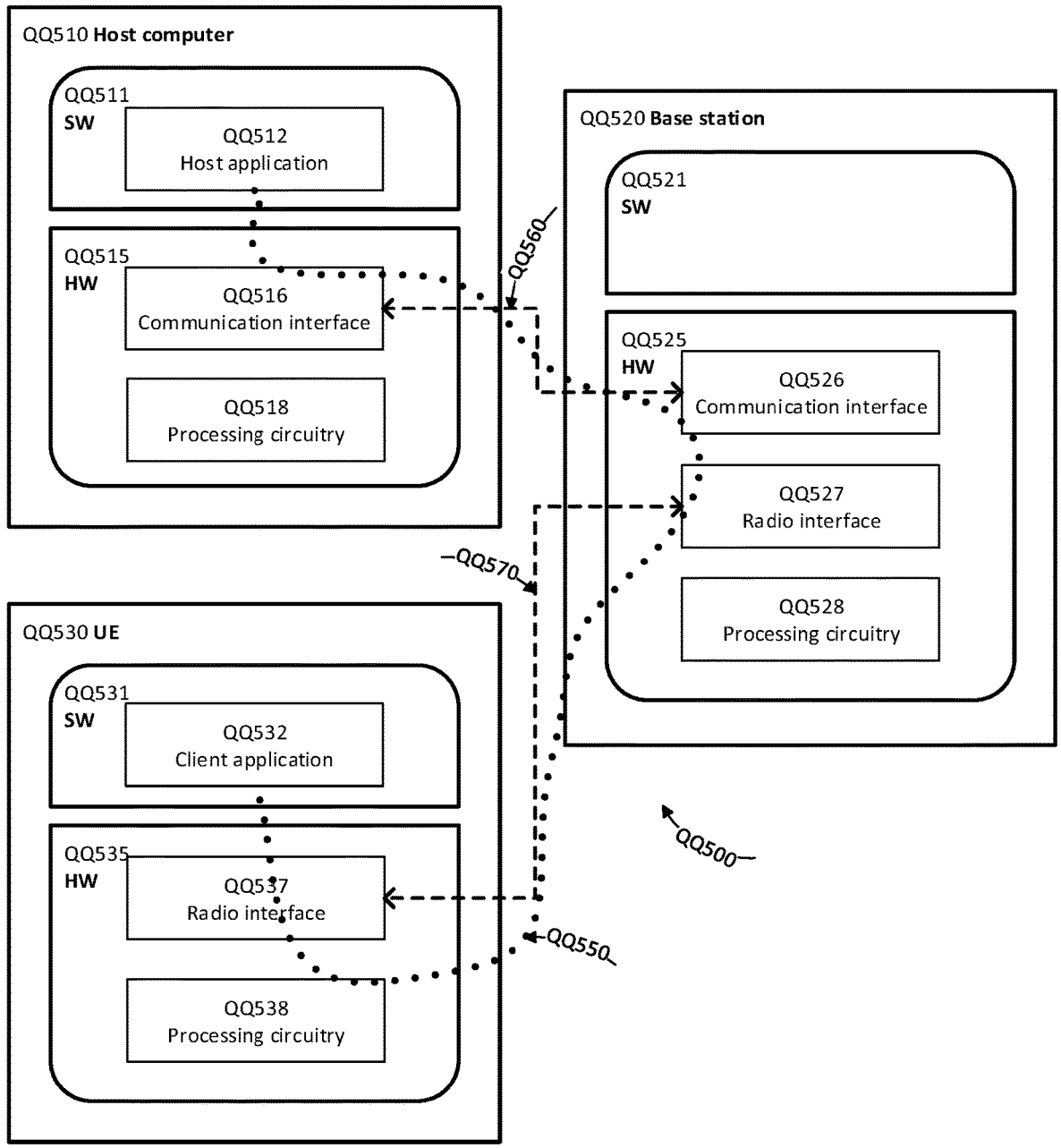
FIG. 16 is a schematic diagram illustrating an example of a host computer communicating via a base station with a user equipment over a partially wireless connection in accordance with some embodiments

FIG. 16 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 16. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 16) served by base station QQ520. Communication interface QQ526 may be configured to facilitate connection QQ560 to host computer QQ510. Connection QQ560 may be direct or it may pass through a core network (not shown in FIG. 16) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 16 may be similar or identical to host computer QQ430, one of base stations QQ412a, QQ412b, QQ412c and one of UEs QQ491, QQ492 of FIG. 15, respectively. This is to say, the inner workings of these entities may be as shown in FIG. 16 and independently, the surrounding network topology may be that of FIG. 15.

In FIG. 16, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figures 17A, 17B:
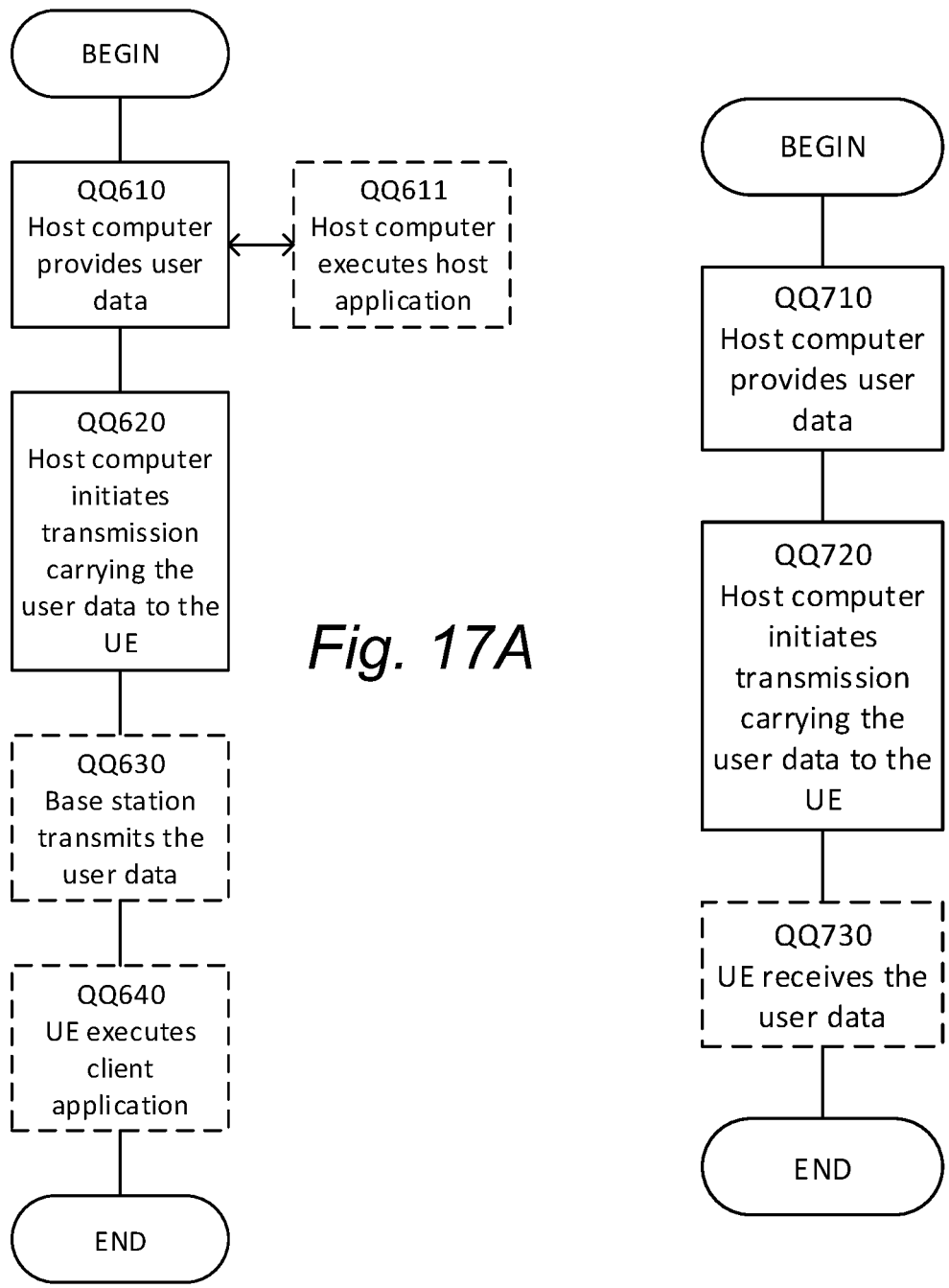
FIG. 17A is a flowchart illustrating a method implemented in a communication system, in accordance with one embodiment
FIG. 17B is a flowchart illustrating a method implemented in a communication system, in accordance with one embodiment.

FIGS. 17A-B are schematic flow diagrams illustrating examples of methods implemented in a communication system including, e.g. a host computer, and optionally also a base station and a user equipment in accordance with some embodiments.

FIG. 17A is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 17A will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 17B is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 17B will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18A:
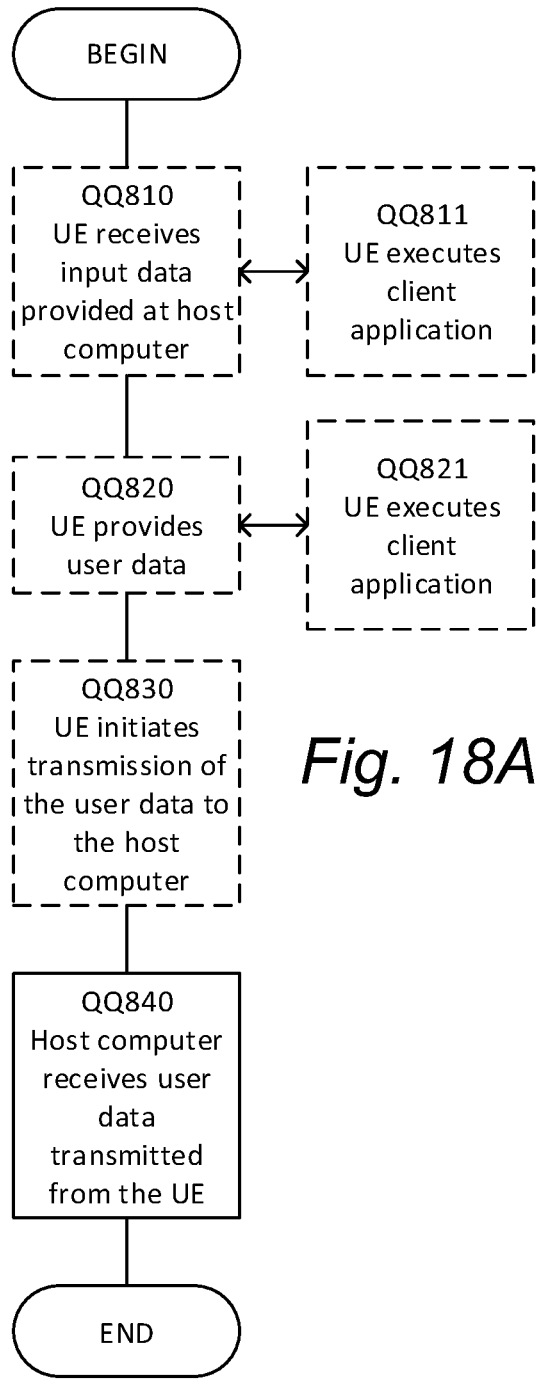
FIG. 18A is a flowchart illustrating a method implemented in a communication system, in accordance with one embodiment.
Figure 18B:
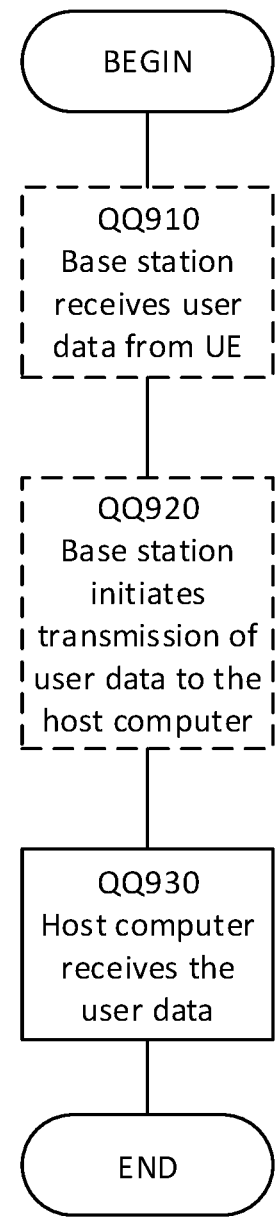
FIG. 18B is a flowchart illustrating a method implemented in a communication system, in accordance with one embodiment.

FIGS. 18A-B are schematic diagrams illustrating examples of methods implemented in a communication system including a host computer, a base station and a user equipment in accordance with some embodiments.

FIG. 18A is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 18A will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 18B is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 18B will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

In the following, examples of illustrative and non-limiting numbered embodiments will be given:

Group B Embodiments

1. A method performed by a network node for estimating Multiple Input Multiple Output, MIMO, channel state information for a radio link between a first radio node 1 comprising a number N, N≥2, of receiving antenna ports $R_i$, i=1, . . . N and a second radio node 10 comprising a number M, M≥2, of transmitting antenna ports $T_i$, i=1, . . . M, the method comprises the steps of:

obtaining S1 partial channel state information from a reference signal transmitted by a number X, 1≤X<M, of the transmitting antenna ports $T_{i=1, 2 \ldots X}$ and received by all of the receiving antenna ports $R_i$, the partial channel state information providing a measure for the N×X propagation channels between all of the receiving antenna ports $R_i$ and the transmitting antenna ports $T_{i=1,2 \ldots X}$; and estimating S2 MIMO channel state information for all N×M propagation channels between the receiving antenna ports $R_i$ and the transmitting antenna ports $T_{i=1, 2 \ldots X}$ based on:

at least one measure assignment model that assign measures to the propagation channels between all of the receiving antenna ports $R_i$ and the remaining number of transmitting antenna ports $T_{i \neq 1, 2 \ldots X}$ that did not transmit the reference signal, and the obtained partial channel state information.

2. The method of embodiment 1, wherein the step S2 of estimating MIMO channel state information for all N×M propagation channels comprises:

generating S21 a representation of the N×X propagation channels in the form of a N×X matrix $H_{KL}$, where a particular column of the matrix $H_{KL}$ contains measures, obtained from the partial channel information, about the propagation channels between a corresponding transmitting antenna port $T_{i=L}$ and the receiving antenna ports $R_{i=1 \ldots K}$, and applying S22 the measure assignment model to the generated matrix $H_{KL}$ in order to construct additional columns to add to the matrix in order to create a N×M matrix representing an estimate of the full MIMO channel state information, the additional columns being constructed based on the columns belonging to the N×X matrix $H_{KL}$ and provides estimates of the propagation channels between the receiving antenna ports $R_{i=1 \ldots K}$ and the transmitting antenna ports $T_{i \neq 1, 2 \ldots X}$ that did not transmit the reference signal.

3. The method of embodiment 2, wherein the step of applying S22 the measure assignment model comprises:

constructing S221 an additional column by selecting particular measures from a corresponding column belonging to the generated matrix $H_{KL}$, and assigning the selected measures to the additional column in such a way that the additional column is orthogonal to the corresponding column belonging to the generated matrix $H_{KL}$.

4. The method of embodiment 3, wherein the method repeats the step S221 of constructing an additional column for all transmitting antenna ports $T_{i \neq 1, 2 \ldots X}$ that did not transmit the reference signal in order to create a N×M matrix representing an estimate of the full MIMO channel state information.

5. The method of embodiment 2, wherein the step of applying S22 the measure assignment model comprises using a column splitting model where components of columns belonging to the generated matrix $H_{KL}$ are used to construct additional columns.

6. The method of embodiment 5, wherein the column splitting model also comprises to set the components used to construct the additional columns to zero in the columns belonging to the generated matrix $H_{KL}$.

7. The method according to any of the embodiments 1-6, wherein the first radio node 1 comprises a network node and the second radio node 10 comprises a User Equipment and the reference signal comprises an uplink sounding signal 8. The method according to any of the embodiments 1-7, wherein the method is performed by the network node 1.

9. A method for controlling a transmission comprising the method according to any of the embodiments 1-8.

10. The method according to embodiment 9, wherein the estimated MIMO channel state information comprises an estimate of the full Downlink, DL, channel state information and wherein the method comprises utilizing the full DL channel information for at least one of the following:
   DL precoding of antenna elements;
   scheduling of DL traffic;
   selection of transmission rank; and
   link adaptation.

Group D Embodiments

11. A communication system including a host computer comprising: processing circuitry configured to provide user data; and
   a communication interface configured to forward the user data to a cellular network for transmission to a user equipment UE,
   wherein the cellular network comprises a network node having a radio interface and processing circuitry, the network node's processing circuitry configured to perform any of the steps of any of the Group B embodiments.

12. The communication system of embodiment 11, further including the network node.

13. The communication system of embodiment 11 or 12, further including the UE, wherein the UE is configured to communicate with the network node.

14. The communication system of any of the embodiments 11-13, wherein:
   the processing circuitry of the host computer is configured to execute a host application, thereby providing the user data; and
   the UE comprises processing circuitry configured to execute a client application associated with the host application.

15. A method implemented in a communication system including a host computer, a network node and a user equipment UE, the method comprising:
   at the host computer, providing user data; and
   at the host computer, initiating a transmission carrying the user data to the UE via a cellular network comprising the network node, wherein the network node performs any of the steps of any of the Group B embodiments.

16. The method of embodiment 15, further comprising, at the base station, transmitting the user data.

17. The method of the embodiment 15 or 16, wherein the user data is provided at the host computer by executing a host application, the method further comprising, at the UE, executing a client application associated with the host application.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

Abbreviations

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method for estimating Multiple Input Multiple Output (MIMO) channel state information for a radio link between a first radio node comprising a number N, N≥2, of receiving antenna ports ($R_i$, i=1, . . . N) and a second radio node comprising a number M, M≥2, of transmitting antenna ports ($T_i$, i=1, . . . M), the method comprises the steps of:
obtaining partial channel state information from a reference signal transmitted by a number X, 1≤X<M, of said transmitting antenna ports ($T_{i=1, 2 \ldots X}$) and received by all of said receiving antenna ports ($R_i$), said partial channel state information providing a measure for N×X propagation channels between all of said receiving antenna ports ($R_i$) and said transmitting antenna ports ($T_{i=1,2 \ldots X}$); and
estimating MIMO channel state information for all N×M propagation channels between said receiving antenna ports ($R_i$) and said transmitting antenna ports ($T_{i=1, 2 \ldots X}$) based on:
at least one measure assignment model that assign measures to the propagation channels between all of said receiving antenna ports ($R_i$) and the remaining number of transmitting antenna ports ($T_{i \neq 1, 2 \ldots X}$) that did not transmit said reference signal, and said obtained partial channel state information.

2. The method according to claim 1, wherein the step of estimating MIMO channel state information for all N×M propagation channels comprises:
generating a representation of the N×X propagation channels in the form of a (N×X) matrix $H_{KL}$, where a particular column of the matrix $H_{KL}$ contains measures, obtained from the partial channel information, about the propagation channels between a corresponding transmitting antenna port ($T_{i=L}$) and the receiving antenna ports ($R_{i=1 \ldots K}$), and
applying said measure assignment model to the generated matrix $H_{KL}$ in order to construct additional columns to add to the matrix in order to create a (N×M) matrix representing an estimate of the full MIMO channel state information, said additional columns being constructed based on the columns belonging to the (N×X) matrix $H_{KL}$ and provides estimates of the propagation channels between the receiving antenna ports ($R_{i=1 \ldots K}$) and the transmitting antenna ports ($T_{i \neq 1, 2 \ldots X}$) that did not transmit said reference signal.

3. The method according to claim 2, wherein the step of applying said measure assignment model comprises:
constructing an additional column by selecting particular measures from a corresponding column belonging to the generated matrix $H_{KL}$, and assigning the selected measures to the additional column in such a way that the additional column is orthogonal to the corresponding column belonging to the generated matrix $H_{KL}$.

4. The method according to claim 3, wherein the method repeats the step of constructing an additional column for all transmitting antenna ports ($T_{i \neq 1, 2 \ldots X}$) that did not transmit said reference signal in order to create a (N×M) matrix representing an estimate of the full MIMO channel state information.

5. The method according to claim 2, wherein the step of applying said measure assignment model comprises using a column splitting model where components of columns belonging to the generated matrix $H_{KL}$ are used to construct additional columns.

6. The method according to claim 5, wherein the column splitting model also comprises to set the components used to construct the additional columns to zero in the columns belonging to the generated matrix $H_{KL}$.

7. The method according to claim 1, wherein said first radio node comprises a network node and said second radio node comprises a User Equipment and said reference signal comprises an uplink sounding signal.

8. A method for controlling a transmission comprising:
obtaining partial channel state information from a reference signal transmitted by a number X, 1≤X<M, of said transmitting antenna ports ($T_{i=1, 2 \ldots X}$) and received by all of said receiving antenna ports ($R_i$), said partial channel state information providing a measure for N×X propagation channels between all of said receiving antenna ports ($R_i$) and said transmitting antenna ports ($T_{i=1, 2 \ldots X}$); and
estimating MIMO channel state information for all N×M propagation channels between said receiving antenna ports ($R_i$) and said transmitting antenna ports ($T_{i=1, 2 \ldots X}$) based on:
at least one measure assignment model that assign measures to the propagation channels between all of said receiving antenna ports ($R_i$) and the remaining number of transmitting antenna ports ($T_{i \neq 1, 2 \ldots X}$) that did not transmit said reference signal, and
said obtained partial channel state information.

9. The method according to claim 8, wherein said estimated MIMO channel state information comprises an estimate of the full Downlink (DL) channel state information and wherein the method comprises utilizing said full DL channel information for at least one of the following:
DL precoding of antenna elements;
scheduling of DL traffic;
selection of transmission rank; and
link adaptation.

10. A network device configured to estimate Multiple Input Multiple Output (MIMO) channel state information for between a first radio node comprising a number N, N≥2, of receiving antenna ports ($R_i$, i=1, ... N) and a second radio node comprising a number M, M≥2, of transmitting antenna ports ($T_i$, i=1, ... M), wherein:
the network device is configured to obtain partial channel state information from a reference signal transmitted by a number X, 1≤X<M, of said transmitting antenna ports ($T_{i=1, 2 \ldots X}$) and received by all of said receiving antenna ports ($R_i$), said partial channel state information providing a measure for N×X propagation channels between all of said receiving antenna ports ($R_i$) and said transmitting antenna ports ($T_{i=1, 2 \ldots X}$); and
the network device is configured to estimate MIMO channel state information for all N×M propagation channels between said receiving antenna ports ($R_i$) and said transmitting antenna ports ($T_i$) based on:
at least one measure assignment model that assign measures to the propagation channels between all of said receiving antenna ports ($R_i$) and the remaining number of transmitting antenna ports ($T_{i \neq 1, 2 \ldots X}$) that did not transmit said reference signal, and
said obtained partial channel state information.

11. The network device according to claim 10 configured to estimate MIMO channel state information for all N×M propagation channels, wherein:
the network device is configured to generate a representation of the N×X propagation channels in the form of a (N×X) matrix $H_{KL}$, where a particular column of the matrix $H_{KL}$ contains measures, obtained from the partial channel information, about the propagation channels between a corresponding transmitting antenna port ($T_{i=L}$) and the receiving antenna ports ($R_{i=1 \ldots K}$), and
network device is configured to apply said measure assignment model to the generated matrix $H_{KL}$ in order to construct additional columns to add to the matrix in order to create a (N×M) matrix representing an estimate of the full MIMO channel state information, said additional columns being constructed based on the columns belonging to the (N×X) matrix $H_{KL}$ and provides estimates of the propagation channels between the receiving antenna ports ($R_{i=1 \ldots K}$) and the transmitting antenna ports ($T_{i \neq 1, 2 \ldots X}$) that did not transmit said reference signal.

12. The network device according to claim 11, wherein the network device is configured to apply said measure assignment model by constructing an additional column by selecting particular measures from a corresponding column belonging to the generated matrix $H_{KL}$, and assigning the selected measures to the additional column in such a way that the additional column is orthogonal to the corresponding column belonging to the generated matrix $H_{KL}$.

13. The network device according to claim 12, wherein the network device is configured to repeat the construction of an additional column for all transmitting antenna ports ($T_{i \neq 1, 2 \ldots X}$) that did not transmit said reference signal in order to create a (N×M) matrix representing an estimate of the full MIMO channel state information.

14. The network device according to claim 11, wherein the network device is configured to apply said measure assignment model by using a column splitting model where components of columns belonging to the generated matrix $H_{KL}$ are used to construct additional columns.

15. The network device according to claim 14, wherein the network device is also configured to set the components used to construct the additional columns to zero in the columns belonging to the generated matrix $H_{KL}$.

16. The network device according claim 10, wherein said network device comprises at least one processor and memory, the memory comprising instructions, which when executed by the at least one processor, cause the at least one processor to estimate MIMO channel state information for a radio link between a first radio node comprising a number N, N≥2, of receiving antenna ports ($R_i$, i=1, ... N) and a second radio node comprising a number M, M≥2, of transmitting antenna ports ($T_i$, i=1, ... M).

17. The network device according to claim 10, wherein said network device comprises a communication circuit.

18. The network device according to claim 10, wherein said first radio node comprises a network node and said second radio node comprises a User Equipment and said reference signal comprises an uplink sounding signal.

19. The network device according to claim 18, wherein said network device is comprised in a network node.

20. An apparatus for estimating, when executed, full rank Multiple Input Multiple Output (MIMO) channel state information for a radio link between a first radio node comprising a number N, N≥2, of receiving antenna ports ($R_i$=1, ... N) and a second radio node comprising a number M, M≥2, of transmitting antenna ports ($T_i$, i=1, ... M), wherein the apparatus comprises:
a reading module for reading partial channel state information obtained from a reference signal transmitted by a number X, $1 \leq X < M$, of said transmitting antenna ports ($T_{i=1, 2 \ldots x}$) and received by all of said receiving antenna ports ($R_i$), said partial channel state information providing a measure for N×X propagation channels between all of said receiving antenna ports ($R_i$) and said transmitting antenna ($T_{i=1, 2 \ldots x}$); and a processing module for estimating MIMO channel state information for all N×M uplink propagation channels between said receiving antenna ports ($R_i$) and said transmitting antenna ports ($T_i$) based on:
- at least one measure assignment model that assign measures to the propagation channels between all of said receiving antenna ports ($R_i$) and the remaining number of transmitting antenna ports ($T_{i \neq 1,2 \ldots x}$) that did not transmit said reference signal, and
- said obtained partial channel state information; and an output module for outputting a representation of said estimate of the MIMO channel state information for all N×M propagation channels.

* * * * *